US010867163B1

(12) United States Patent
Taine et al.

(10) Patent No.: US 10,867,163 B1
(45) Date of Patent: Dec. 15, 2020

(54) FACE DETECTION FOR VIDEO CALLS

(71) Applicant: Facebook, Inc., Menlo Park, CA (US)

(72) Inventors: Stephane Taine, Issaquah, WA (US);
Brendan Benjamin Aronoff, San Francisco, CA (US); Jason Clark, Woodinville, WA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 16/384,046

(22) Filed: Apr. 15, 2019

Related U.S. Application Data

(63) Continuation of application No. 15/364,188, filed on Nov. 29, 2016.

(51) Int. Cl.
| | |
|---|---|
| *G06K 9/00* | (2006.01) |
| *G06T 7/11* | (2017.01) |
| *G06T 7/73* | (2017.01) |
| *G06T 7/33* | (2017.01) |
| *H04N 7/15* | (2006.01) |

(52) U.S. Cl.
CPC ..... *G06K 9/00281* (2013.01); *G06K 9/00228* (2013.01); *G06T 7/11* (2017.01); *G06T 7/33* (2017.01); *G06T 7/73* (2017.01); *H04N 7/15* (2013.01); *G06T 2207/10016* (2013.01); *G06T 2207/10024* (2013.01); *G06T 2207/20132* (2013.01); *G06T 2207/30201* (2013.01); *G06T 2210/12* (2013.01); *G06T 2210/22* (2013.01)

(58) Field of Classification Search
USPC ................................................. 348/14.07
See application file for complete search history.

(56) References Cited

U.S. PATENT DOCUMENTS

| | | | |
|---|---|---|---|
| 6,119,147 A | 9/2000 | Toomey et al. | |
| 6,452,615 B1 | 9/2002 | Chiu et al. | |
| 9,531,655 B1 | 12/2016 | Buchheit | |
| 2004/0025174 A1 | 2/2004 | Cerrato | |
| 2005/0063582 A1 | 3/2005 | Park et al. | |
| 2005/0069852 A1 | 3/2005 | Janakiraman et al. | |
| 2007/0239839 A1 | 10/2007 | Buday et al. | |
| 2009/0300525 A1 | 12/2009 | Jolliff et al. | |
| 2010/0253689 A1 | 10/2010 | Dinicola et al. | |
| 2011/0078578 A1 | 3/2011 | Calis | |
| 2011/0141257 A1* | 6/2011 | Hwang | G06K 9/6255 348/77 |
| 2013/0046548 A1 | 2/2013 | Snider | |
| 2013/0188840 A1 | 7/2013 | Ma et al. | |
| 2014/0223462 A1 | 8/2014 | Aimone et al. | |
| 2015/0012270 A1 | 1/2015 | Reynolds | |

(Continued)

*Primary Examiner* — Amal S Zenati

(57) ABSTRACT

Exemplary embodiments relate to uses of face detection in video, and especially in video calls. In some embodiments, face detection may be used to center a camera shot by maintaining a face in the center of a screen. The centering may be applied selectively, such as by overriding centering if the user is looking off-screen. The video may also be cropped to better fit a face in a screen, or to allow multiple faces to appear on screen. In some embodiments, emphasizing the face over the background (or parts of the face over the whole face) allows for improvement in video call performance. Moreover, these techniques can be used to bring certain areas of a camera shot into focus while de-emphasizing the background (or vice versa).

15 Claims, 21 Drawing Sheets

(56) References Cited

U.S. PATENT DOCUMENTS

| | | |
|---|---|---|
| 2015/0103134 A1 | 4/2015 | Cheng |
| 2015/0195491 A1* | 7/2015 | Shaburov ................ H04N 7/15 |
| | | 348/14.12 |
| 2015/0245133 A1 | 8/2015 | Kim et al. |
| 2015/0350737 A1 | 12/2015 | Anderson et al. |
| 2016/0098169 A1 | 4/2016 | Herdy |
| 2016/0300379 A1 | 10/2016 | Du et al. |
| 2016/0307563 A1 | 10/2016 | Shrivastava et al. |
| 2017/0163434 A1 | 6/2017 | Bathurst et al. |
| 2017/0187868 A1 | 6/2017 | Katai et al. |
| 2017/0319123 A1* | 11/2017 | Voss ...................... A61B 5/681 |
| 2017/0332044 A1 | 11/2017 | Marlow et al. |
| 2017/0344211 A1 | 11/2017 | Faulkner |
| 2018/0070008 A1* | 3/2018 | Tyagi ................ G06K 9/00335 |

* cited by examiner

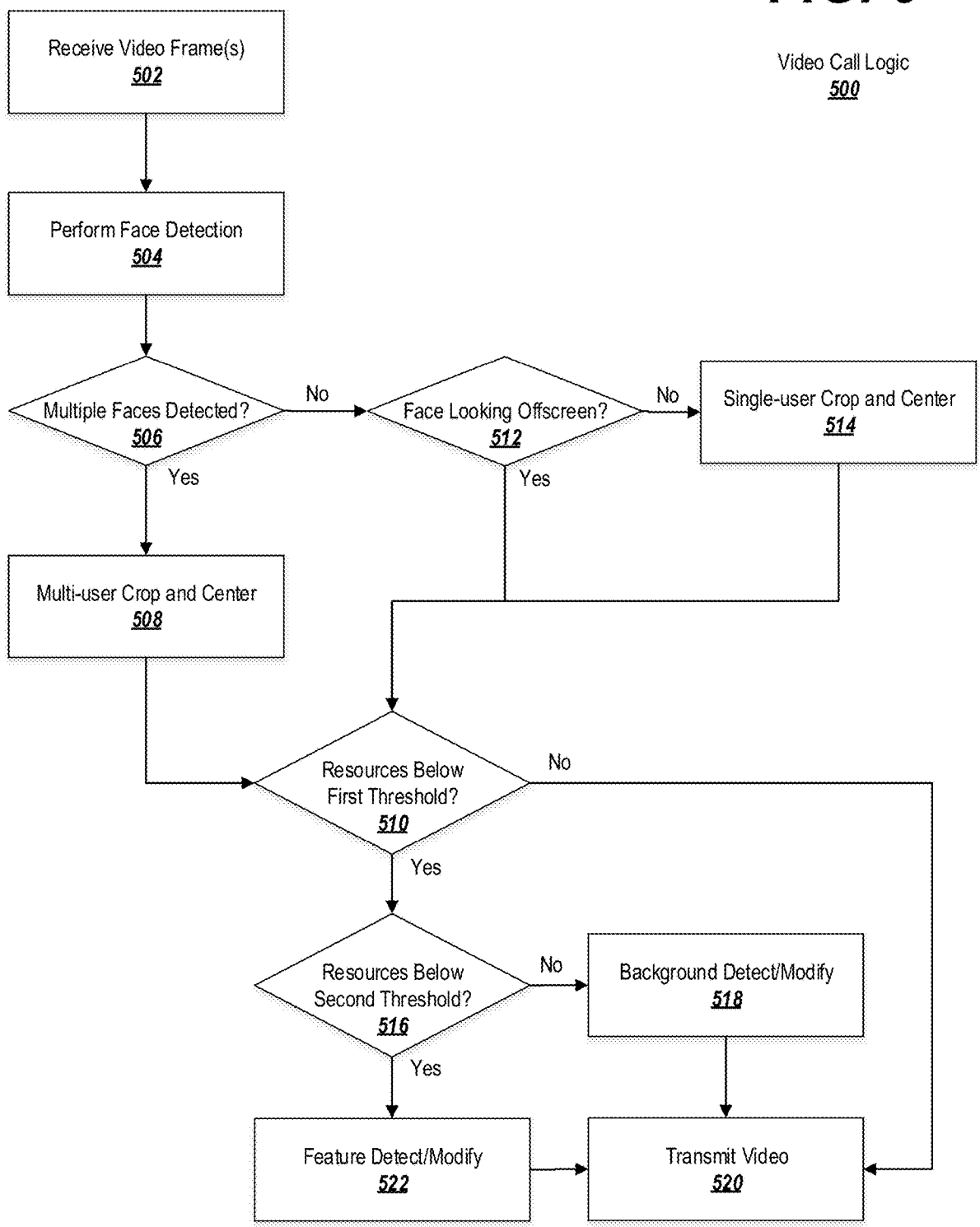

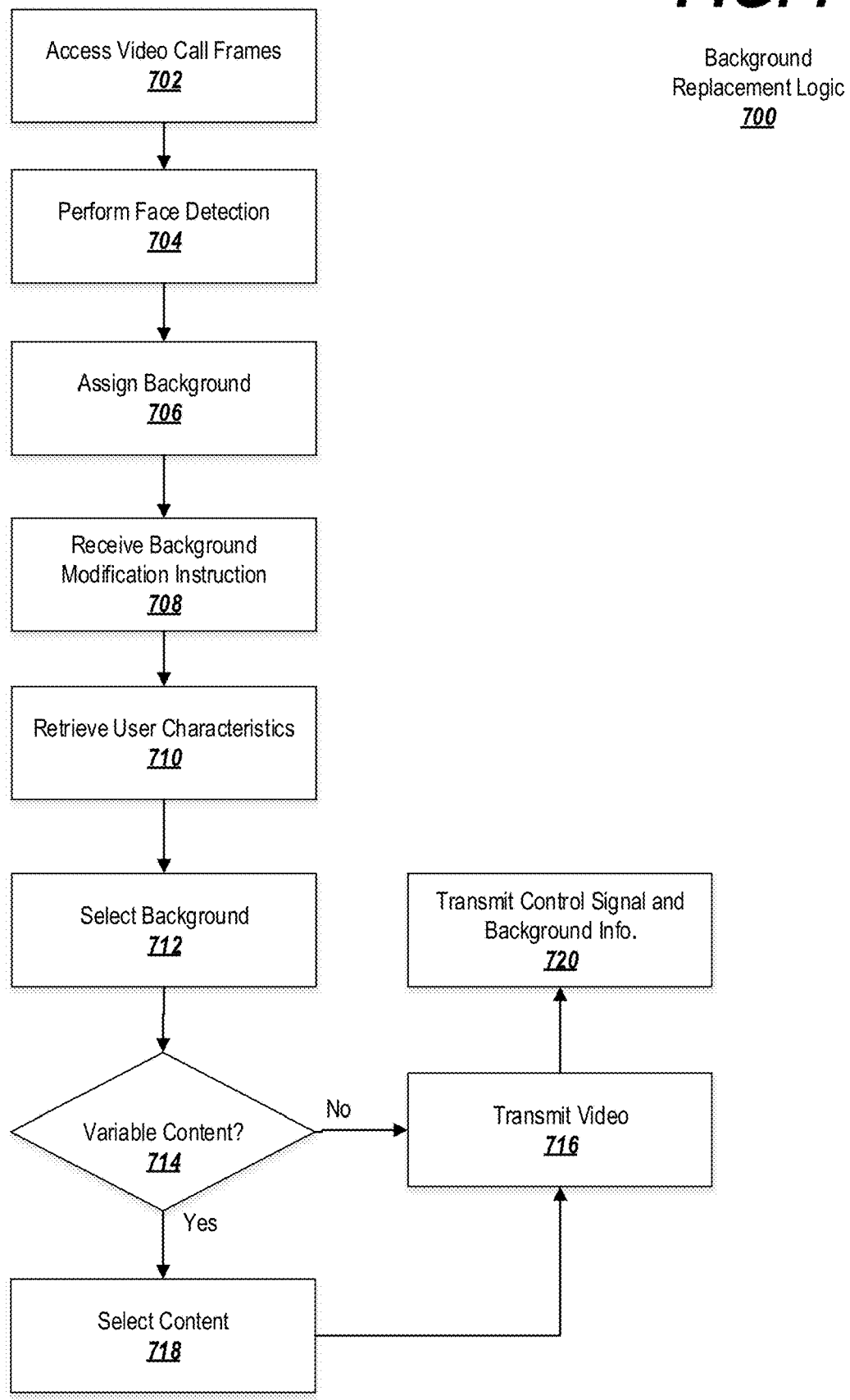

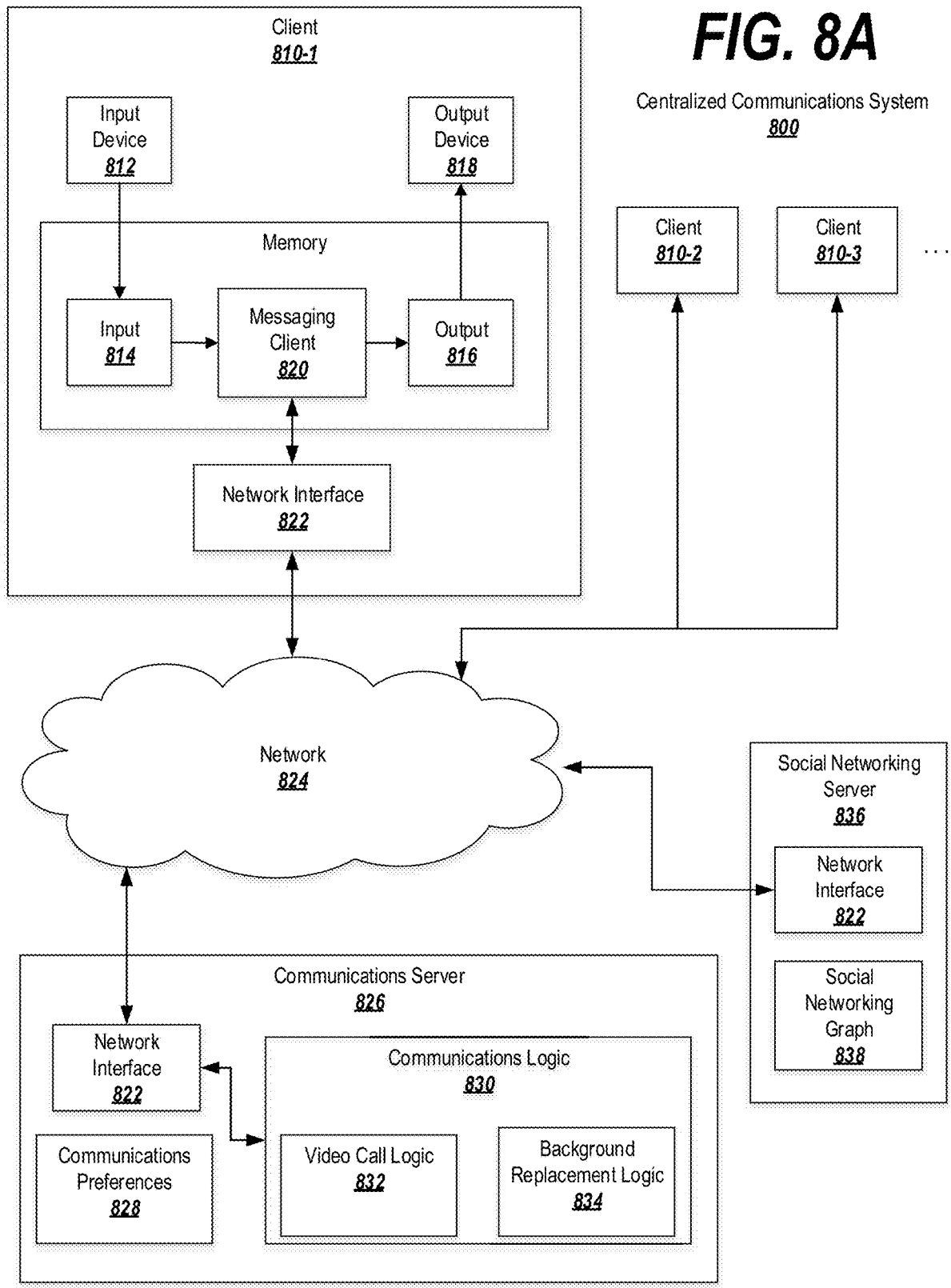

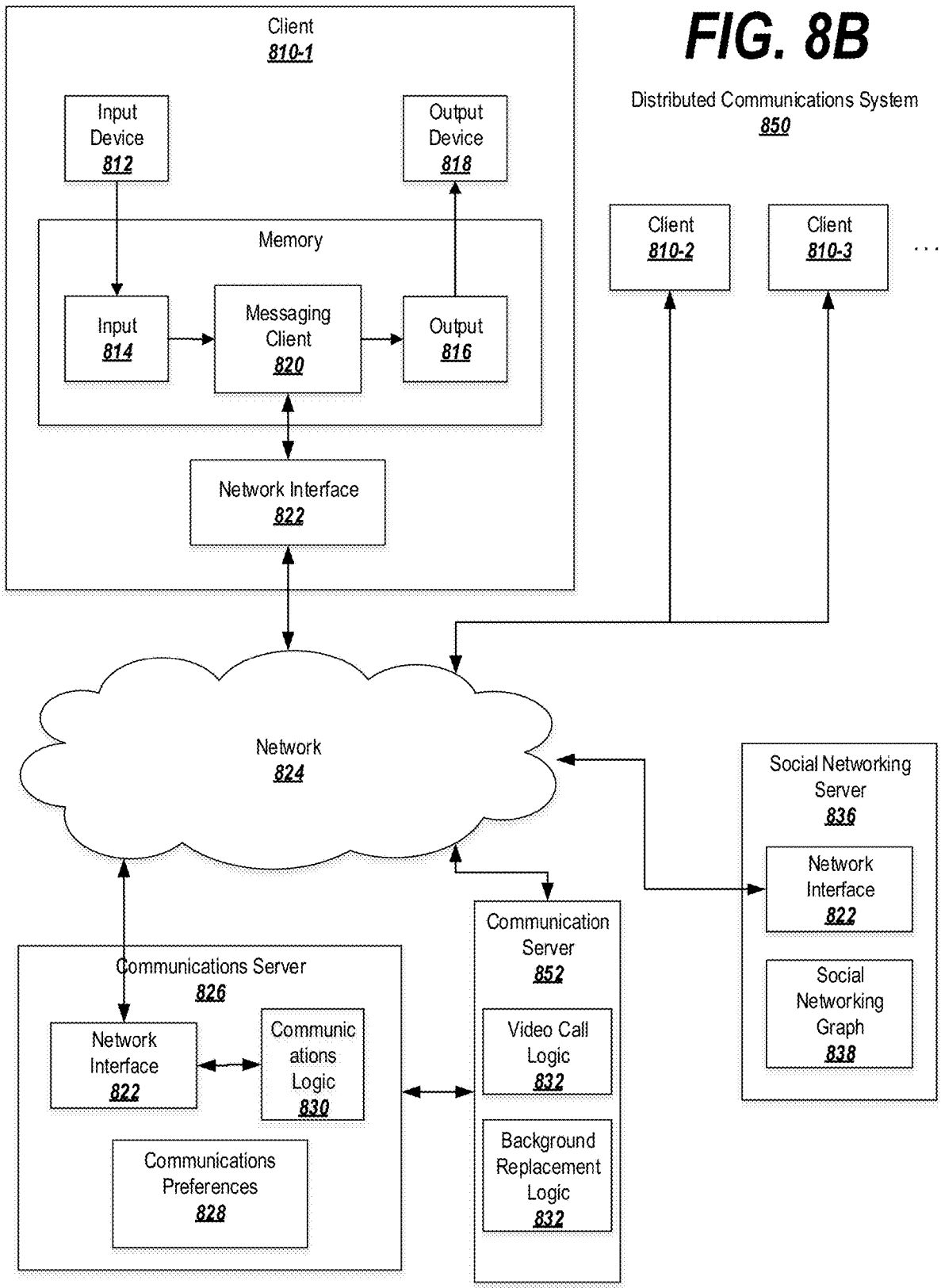

US 10,867,163 B1

FACE DETECTION FOR VIDEO CALLS

RELATED APPLICATIONS

This application is a continuation of, claims the benefit of and priority to previously filed U.S. patent application Ser. No. 15/364,188 filed Nov. 29, 2016, titled "FACE DETECTION FOR VIDEO CALLS", which is hereby incorporated by reference in its entirety.

BACKGROUND

Facial detection technology allows for the detection of a face in a photo or video, and in some cases allows for individuals to be identified based on their facial characteristics. Recently, facial detection techniques have been used to apply overlays on faces, such as by adding a graphical mask over a face in a video.

BRIEF DESCRIPTION OF THE DRAWINGS

FIG. 5 is a flowchart depicting exemplary logic for performing facial detection and frame modification in a video call.

FIG. 7 is a flowchart depicting exemplary logic for identifying and replacing a background in a video frame.

FIG. 8A is a block diagram providing an overview of a system including an exemplary centralized communications service;

FIG. 8B is a block diagram providing an overview of a system including an exemplary distributed communications service;

DETAILED DESCRIPTION

Figure 1A:
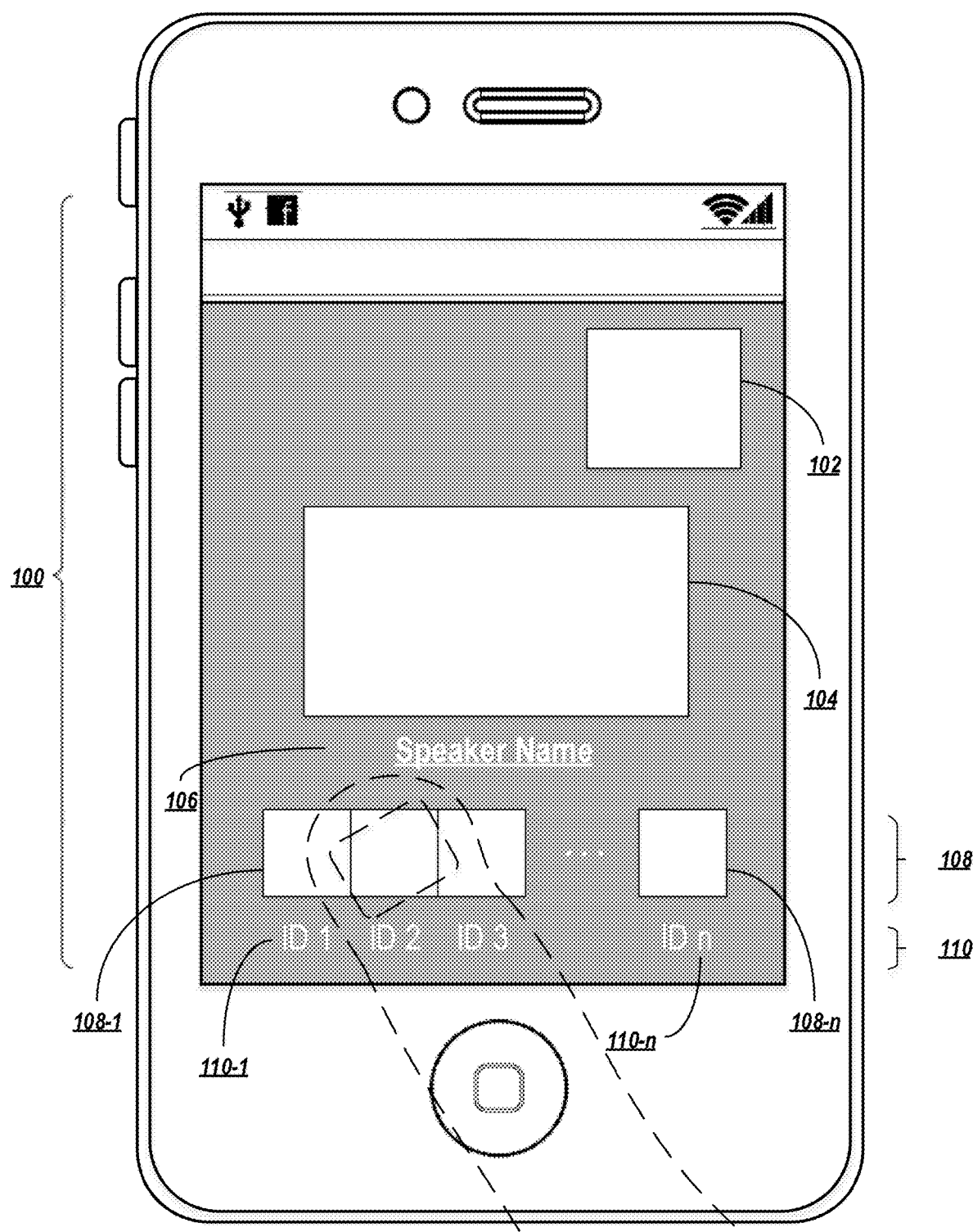
FIG. 1A depicts an exemplary interface for a video communication.

Exemplary embodiments relate to new techniques for using face detection technology in the context of a video conversation. According to some embodiments, face detection may be used to center a camera shot by maintaining a face in the center of a screen. The video may also be cropped to better fit a face in a screen, or to allow multiple faces to appear on screen. By using face detection (as opposed to other techniques such as movement-based metrics), the relevant areas of the video may be better identified and may be selected and centered more efficiently.

The centering may be applied selectively, such as by overriding centering if the user is looking off-screen. The centering may be overridden under the assumption that the user is actively attempting to point the camera at something located off-screen. In some cases, the centering may be overridden only in certain contexts, such as when only a single person appears in the frame (under the assumption that it is more likely that one user looking off screen is attempting to show something that is located off-screen as compared to when one user from a group looks off-screen).

In some embodiments, the face may be emphasized over the background, such as by blurring the background or rendering the background at a lower resolution than the face. In a similar vein, particularly expressive features of the face (e.g., the eyes or mouth) may be emphasized over the rest of the face by blurring the rest of the face or rendering the expressive features at a higher resolution than the rest of the face. These techniques may be combined in order to render the expressive features at a relatively high resolution, the rest of the face at an intermediate resolution, and the background at a relatively low resolution. These techniques can be used to bring certain areas of a camera shot into focus while de-emphasizing others (or vice versa).

These emphasis techniques may also be employed to improve the quality of a video call, particularly in a limited resource environment (e.g., when the video call is taking place over a low-bandwidth connection). If the level of resource availability is low, the face may be rendered in a higher level of detail than the background, thus saving resources for the more important or relevant elements of the frame. If the level of resource availability is extremely low, then only the most expressive features may be rendered in high detail, thus providing only the most essential context in the video feed.

According to some embodiments, a video call may be implemented by transmitting full frames, referred to as key frames, and partial frames, referred to as delta frames. When partial frames are transmitted, face detection may be used to determine whether portions of the partial frame belong to a face or the background (and, if the portion belongs to the face, whether the portion belongs to an expressive feature of the face or a non-expressive feature of the face). In order to transmit the delta frames, the delta frames may be quantized to represent components of the frames (e.g., pixels) as discrete values. The more important parts of the delta frames (e.g., the face as compared to the background, or the expressive features as compared to the remainder of the face) may be more highly quantized, or rendered at a higher resolution, than less important parts of the delta frames. This technique allows resources to be conserved when transmitting the delta frames.

Further embodiments, which may be used in conjunction with the embodiments described above, relate to the uses of face detection to modify the background of a video feed. Portions of frames corresponding to a face may be detected, and the remainder of the frame may be identified as background. The thus-detected background may be replaced with a movie, event, or other material.

Different types of materials may be targeted at different users based on user affinities or preferences. For example, the new background may include one or more areas dedicated to variable or custom material. Depending on the user's characteristics, these areas may be replaced with content, such as information or promotional materials. Different content may be provided to different users. For example, if one user is determined to be more likely to be responsive to information about gardening than information about rock and roll music, the first user may see an invitation to join a local gardening club in the custom content areas. A second user who is particularly fond of music might see the tour dates of their favorite music group in the custom content areas. In another example, the custom content areas may be replaced with promotional materials; depending on whether the user is more likely to purchase a first brand or a second brand, the user may see a corresponding promotional material in the custom content area.

In some embodiments, a user may manually select and apply a background during a video call. The user may select from a library of backgrounds stored locally at the user's client device or remotely at a server.

When applying a custom background, a client device or server may receive a control signal and a copy of the background (e.g., in the event that the background is maintained at a remote location) or an identifier of the background (e.g., in the event that the background is maintained locally). The client may recognize the control signal and, in response, apply the background. If the background was provided with the control signal, the provided background may be applied by displaying the background at any portion of an associated video frame that does not correspond to a face. If a background identifier was provided with the control signal, then the client device or server may retrieve a corresponding background from a background library and apply the background by displaying the background at any portion of an associated video frame that does not correspond to a face.

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided.

As an aid to understanding, a series of examples will first be presented before detailed descriptions of the underlying implementations are described. It is noted that these examples are intended to be illustrative only and that the present invention is not limited to the embodiments shown.

Exemplary Interfaces

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators)

are intended to be variables representing any positive integer. Thus, for example, if an implementation sets a value for a=5, then a complete set of components 122 illustrated as components 122-1 through 122-*a* may include components 122-1, 122-2, 122-3, 122-4, and 122-5. The embodiments are not limited in this context.

FIG. 1A depicts an interface 100 for a communications application adapted to show a group or one-to-one video call. The interface 100 may be displayed on the device of a first user. The interface 100 may include a preview window 102, in which the first user can see the video feed that they are current sending to the rest of the participants.

The interface 100 may further include a main window 104 in which the speaker that has been currently selected as most-relevant is shown. The main window 104 may be the most prominent window in the interface 100, and may display a video feed that is larger in size and/or at a higher resolution than the video in the preview window 102 or other windows (such as the roster 108 described below).

Optionally, the participant displayed in the main window 104 may be identified on the interface 100 by an identifier 106. The identifier 106 may be, for example, the name or handle of the participant displayed in the main window 104.

A roster 108 of participants in the call may also be displayed. The roster 108 may include a window 108-*i* dedicated to each participant in the call, or may exclude the currently-relevant speaker displayed in the main window 104. Each window 108-*i* may display a video feed of the associated participant (if such a feed is available). The roster 108 may be associated with some functionality. For example, selecting one of the windows 108-*i* (as shown in FIG. 1A) may lock the selected participant to the main window for a period of time (or until the locking is manually canceled, or until an event occurs, such as another video feed becoming most relevant). Alternatively or in addition, selecting a window 108-*i* may cause additional information about the associated participant to be displayed, among other possibilities. The windows 108-*i* of the roster 108 may each be associated with an identifier 110-*i* identifying the participant in the window 108-*i*. The identifier 110-*i* may be, for example, a name or handle of the participant. In some cases, the participant may be associated with a long identifier and a short identifier (e.g., a full name and a nickname, or a full name and a first name only). In some embodiments, the short identifier may be displayed as the identifier 110-*i*, while the longer identifier may be displayed as the identifier 106 for the main window 104.

Figure 1B:
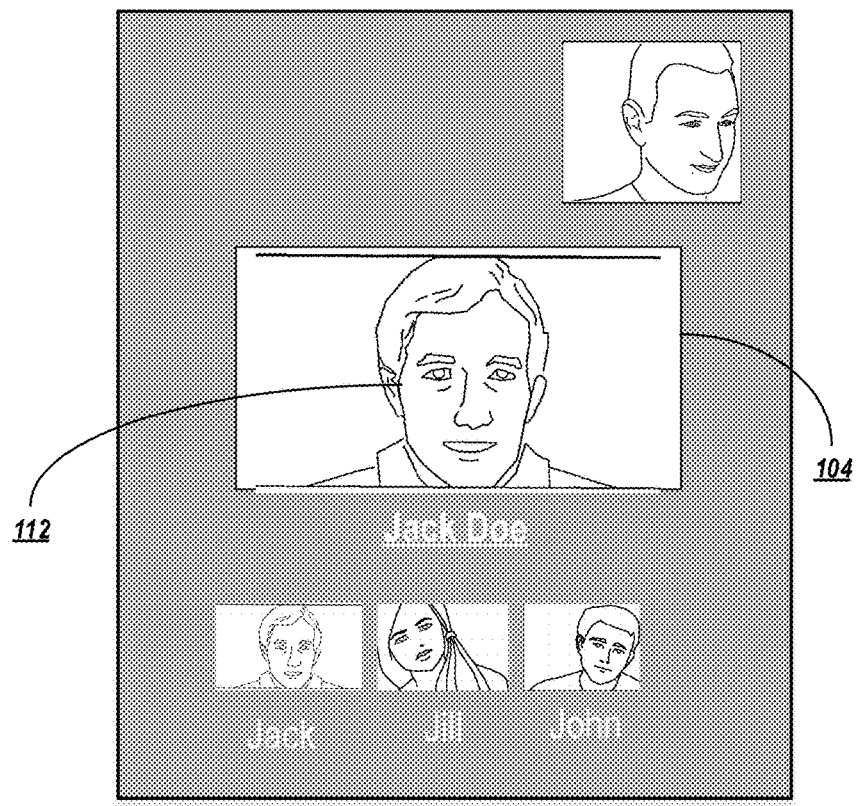
FIG. 1B depicts an exemplary interface in which a user's face is centered in a main window of the interface.

FIG. 1B depicts an exemplary interface in which a user's face 112 is centered in a main window 104 of the interface. This is often desirable behavior, especially when the interface is displayed on a small display (such as a display of a mobile device). By centering the user's face 112 in the main window 104, the available display real estate may be best utilized because the relevant portion of the video feed (in this case, the user's face 112) is displayed in the most prominent location of the main window 104.

Figure 1C:
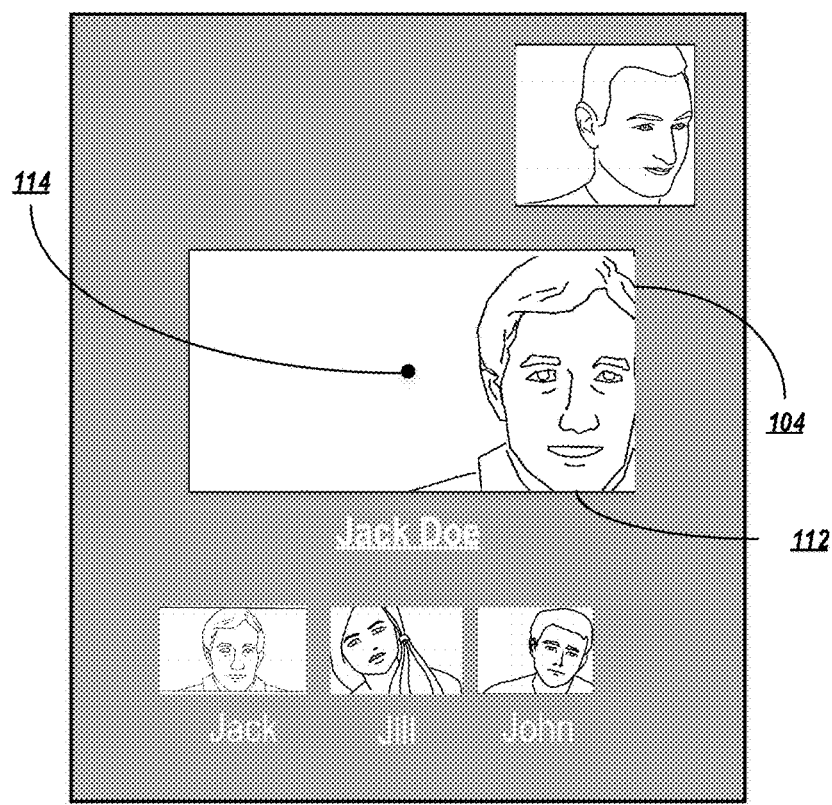
FIG. 1C depicts an exemplary interface in which the user's face has drifted off-center.

On the other hand, when the user's face 112 strays from the center 114 of the main window 104, as shown in FIG. 1C, recipients of the video may become distracted by materials other than the user's face 112. The user's face 112 may stray from the center 114 of the main window 104 for several reasons. For example, the user may move their head while keeping their camera steady, may move the camera while keeping their head steady, or a combination of both. Some camera control software also allows for automatic zooming (e.g., based on motion detected in the video feed), which may incorrectly center the camera on a location outside of the user's face 112. In another example, post-processing software may crop a relatively large video frame into a smaller video frame, but may do so in such a way that the user's face 112 is not centered in the cropped frame.

Figure 1D:
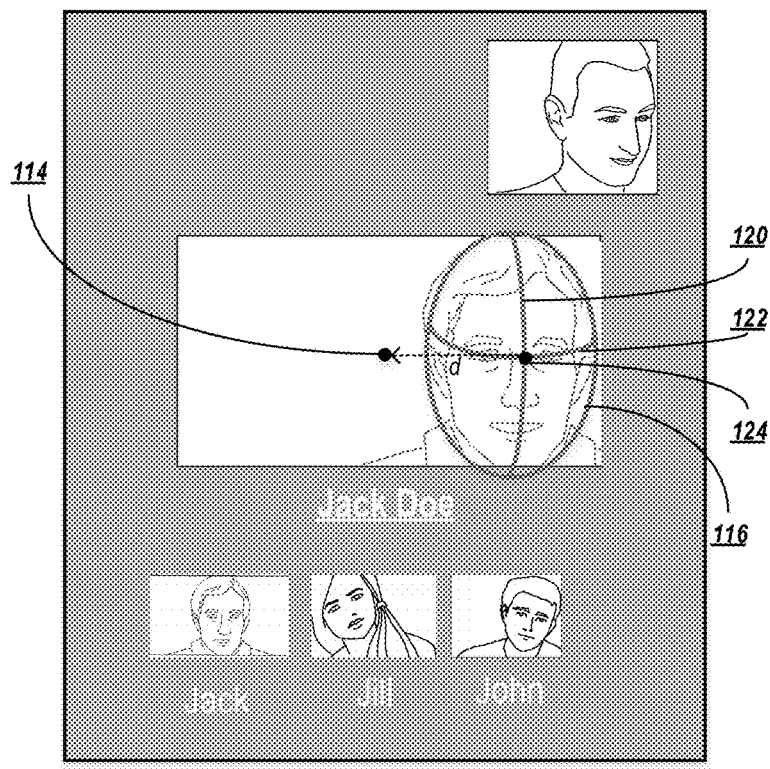
FIG. 1D depicts an exemplary technique for re-centering the user's face.

In order to correct this issue, the user's face may be re-centered by automatically adjusting the camera or by changing the portion of the video feed displayed in the main window 104. FIG. 1D provides an example of a technique for determining an amount to adjust the camera or the video feed in order to re-center a user's face.

Facial detection techniques may be applied determine a bounding shape 116 that substantially contains the user's face. In some cases, it may be difficult to entirely encompass the user's face with a relatively simple bounding shape 116, and so some small portions of the face may extend beyond the boundaries of the bounding shape 116. Furthermore, because few people have perfectly square or oval faces, the bounding shape 116 may include some areas that do not contain the user's face. Preferably, the bounding shape 116 is sized and shaped so as to fit as much of the user's face in as possible, while avoiding encompassing areas that do not include the face. Further preferably, the bounding shape 116 is a relatively simple shape, such as a square or oval, rather than a relatively complex shape, such as a trapezoid or freeform curve.

Optionally, one or more axes of the bounding shape 116 may be defined. In the depicted example, the facial detection technique involves identifying features of the face, such as the ears, eyes, nose, and mouth. A vertical axis 120 extends vertically through the approximate center of the face, splitting the eyes, nose, and mouth in half. A horizontal axis 122 extends horizontally through the approximate center of the face, approximately through the ears and eyes.

When the face is facing towards the camera, an intersection point 124 between the vertical axis 120 and the horizontal axis 122 sits at approximately the center of the face. The system may determine a distance d between the intersection point 124 and the center 114 of the main window 104, as well as a direction from the intersection point 124 to the center point 114. The camera angle may then be adjusted based on the direction and the distance d, or the displayed portion of the frame may be adjusted to move the intersection point 124 so that it aligns with the center 114 of the main window 104.

When the face is not facing towards the camera, the intersection point 124 may be offset from the center of the user's head (as discussed in more detail below in connection with FIG. 1H). This offset may optionally be corrected for before re-centering the face.

Figure 1E:
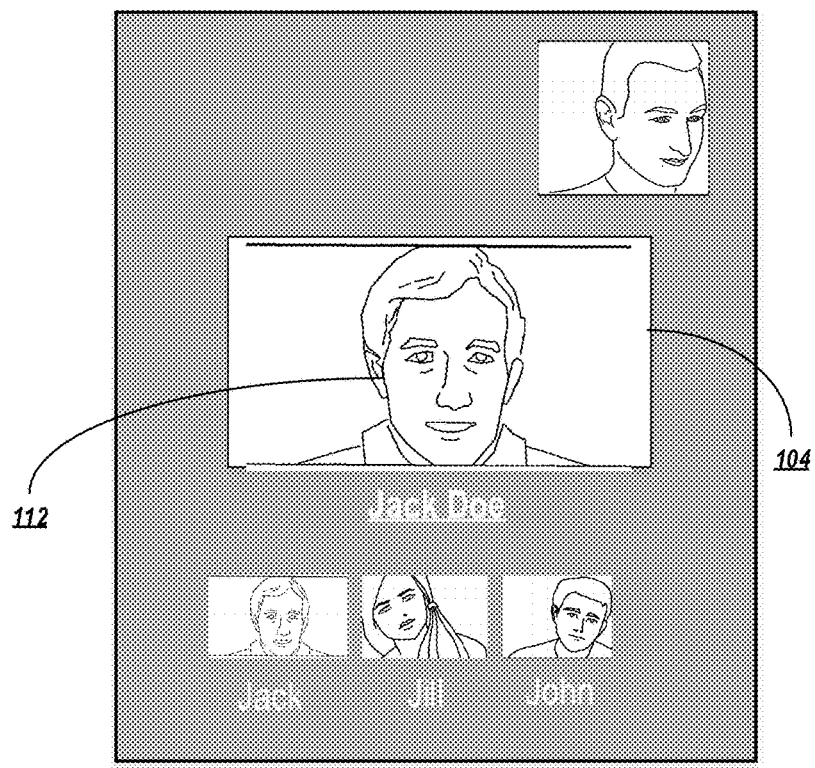
FIG. 1E depicts an exemplary interface in which the user's face is re-centered in the main window.

After re-centering, the face 112 may be substantially centered in the main window 104, as shown in FIG. 1E.

Figure 1F:
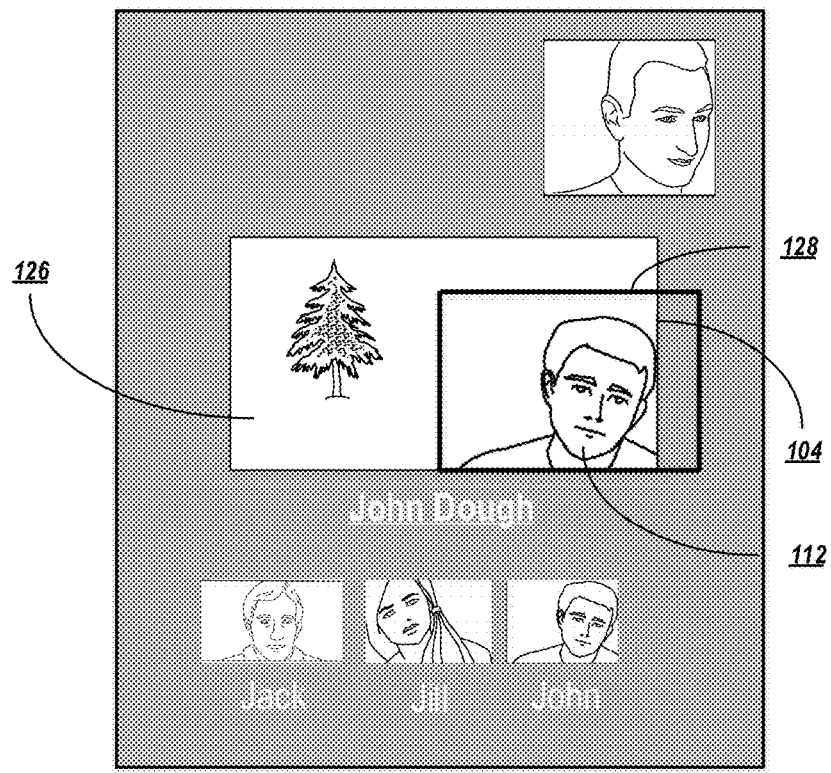
FIG. 1F depicts an exemplary interface in which a user's face is off-center in the main window of the interface, and the video frame is configured such that the user's face occupies only a small portion of the interface.

As an alternative to, or in addition to, centering the face, the video frame may also be cropped to. For example, FIG. 1F depicts an exemplary interface in which a user's face 112 is off-center in the main window 104 of the interface, and the video frame is configured such that the user's face occupies only a small portion of the main window 104. The remainder of the main window is occupied by background 126.

A system may apply facial detection as described above, and may define a bounding box 128 that substantially encompasses the face. The proportions of the bounding box 128 may be defined based on the proportions of the main window 104—for example, the relative height:length ratio of the bounding box 128 may be the same as (or substantially similar to) the height:length ratio of the main window 104. While maintaining these proportions, the size of the bounding box may be defined so that the face 112 occupies a substantial portion of the length or height of the bounding box 128 (e.g., occupying at least a predetermined amount of the length, height, or total area of the bounding box). In some embodiments, a buffer may be defined on each side of the face, and a minimally-sized bounding box 128 that substantially maintains the proportions of the main window 104 while not extending into the buffer region may be selected. Preferably, the face 112 is centered in the bounding box 128 (e.g., using the techniques described above).

In some embodiments, the portion of the video frame that is displayed in the main window 104 does not include the entirety of the video frame—for example, the interface may apply software control to remove a border region of the frame. Accordingly, some video information extending beyond the edges of the main window 104 is not displayed, allowing the bounding box 128 to extend beyond the borders of the main window 104.

Figure 1G:
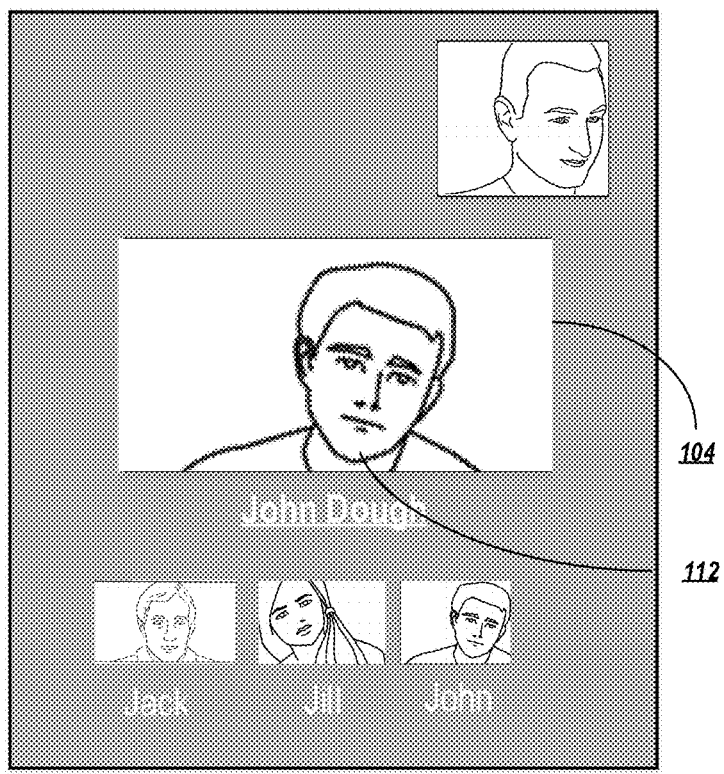
FIG. 1G depicts an exemplary interface in which the frame is cropped and the user's face is re-centered in the main window.

Upon cropping the video frame, the face 112 may be centered in the main window 104 and may occupy substantially a predetermined amount of the length, height, or area of the main window 104, as shown in FIG. 1G.

In some contexts, the system may refrain from applying cropping and/or centering. In general, cropping or centering is applied in order to reflect the most relevant or pertinent feature in the video frame. In most cases, that is the user's face. However, in some cases, the most relevant or pertinent feature in the frame may be some object other than the user's face. For example, a user might intentionally turn their camera towards a nearby object, with the intention of showing the object to the other participants in the video call. Most often, this occurs in one-on-one video calls, since group calls tend to focus primarily on the people taking part in the conversation (although it is also possible that a participant in the group conversation may wish to refocus the camera on something else, such as a whiteboard during a group presentation).

In this circumstance, it may be undesirable for the system to attempt to keep the user's face cropped and centered in the video frame. This may cause the view in the main window 104 to "stick" to the user's face while the user attempts to move the view to something else.

However, when attempting to point the camera at an object that is out-of-frame, the user often looks at the target object before or during the process of reorienting the camera. Therefore, according to some embodiments, the system may detect that the user is looking off-camera, and may refrain from cropping or recentering the frame if the frame view subsequently moves in the direction that the user was looking.

Figure 1H:
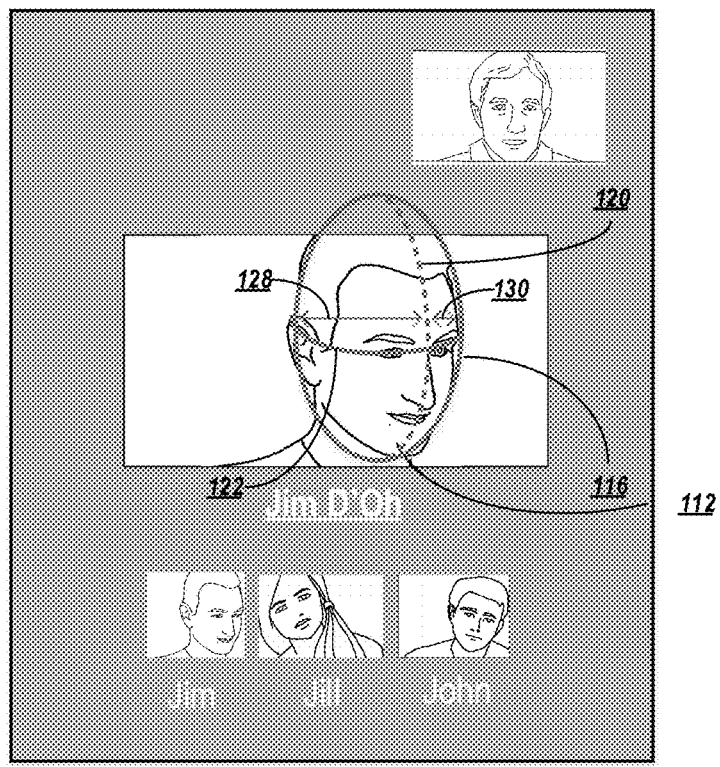
FIG. 1H depicts an exemplary interface in which a user is looking out-of-frame.

For instance, FIG. 1H depicts an exemplary interface in which a user is looking out-of-frame. As in previous examples, face detection may be performed and a bounding shape 116 may be drawn around the user's face 112. A vertical axis 120 and a horizontal axis 122 may be defined.

Depending on the direction that the user is looking, the distance from respective edges of the bounding shape 116 and the axes 120, 122 may vary. For instance, in this case the user is looking to the right (in the displayed frame). A distance 128 from the left edge of the bounding shape 116 to the vertical axis 120 is therefore greater than a corresponding distance 130 from the right edge of the bounding shape 116 to the vertical axis 120. If the user were looking to the left, the opposite would be the case. Similarly, the user's up/down directionality may be determined by comparing a relative distance from the top and bottom of the bounding shape 116 to the horizontal axis 122.

Determining the direction that the user is looking may also be performed in other ways, such as by calculating relative areas of the left/right and/or top/bottom hemispheres within the bounding shape 116, or identifying sub-features of the face 112 (such as the user's eyes) and evaluating a direction in which the sub-features are pointing.

Figure 1I:
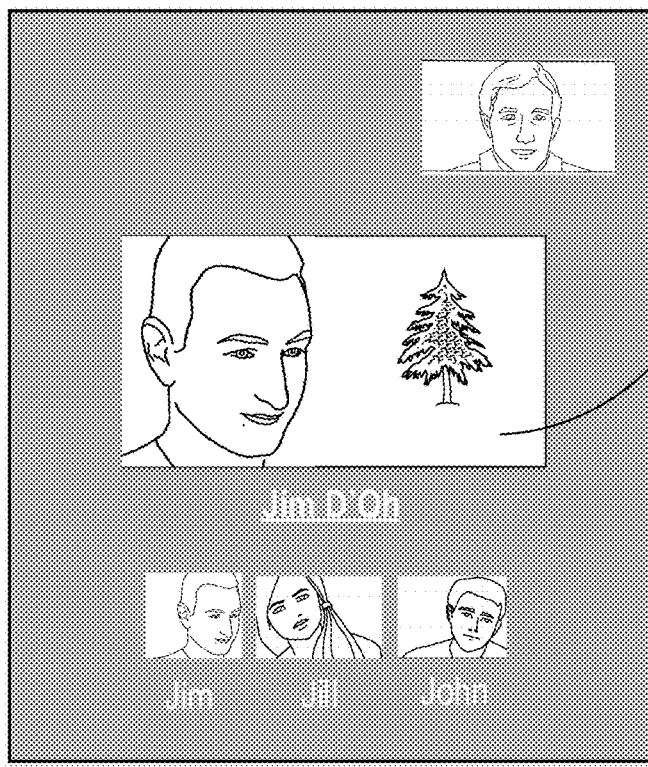
FIG. 1I depicts an exemplary interface in which the user's face is allowed to remain off-center in the frame, in order to display background information.

Having thus determined that the user is looking off-frame to the right, the system may then detect that the camera view is then moved in that direction, as shown in FIG. 1I. In this case, the system may refrain from cropping or re-centering the frame as the camera view is moved. Thus, more background material 126 is displayed. In some embodiments, a cropped view may be widened so that more background context is available to be displayed.

In some embodiments, facial detection may be used to efficiently perform cropping and centering when multiple people exist in a frame. FIGS. 2A-2D depict exemplary interfaces for performing multi-user cropping and centering.

Figure 2A:
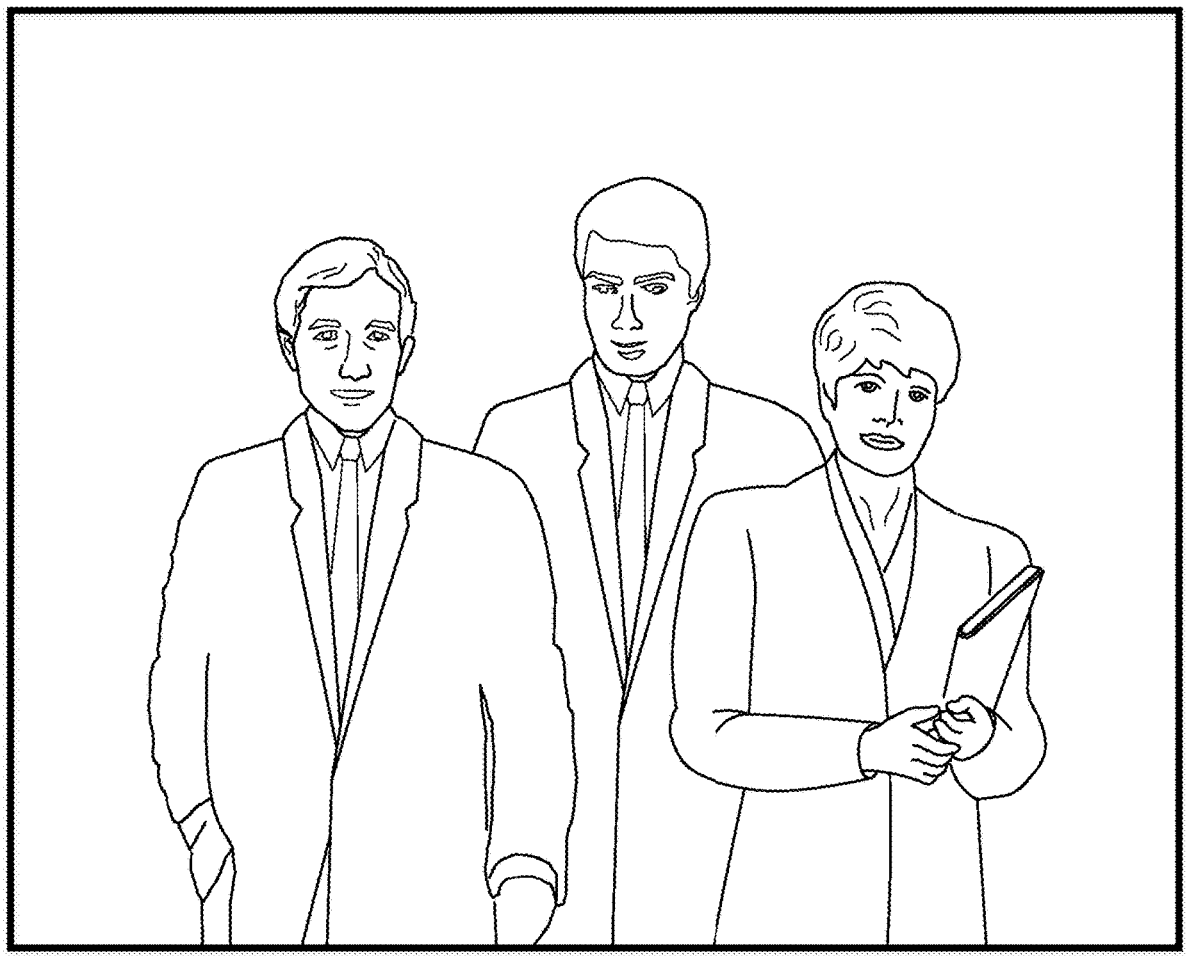
FIG. 2A depicts an exemplary frame from a video call including three users.
Figure 2B:
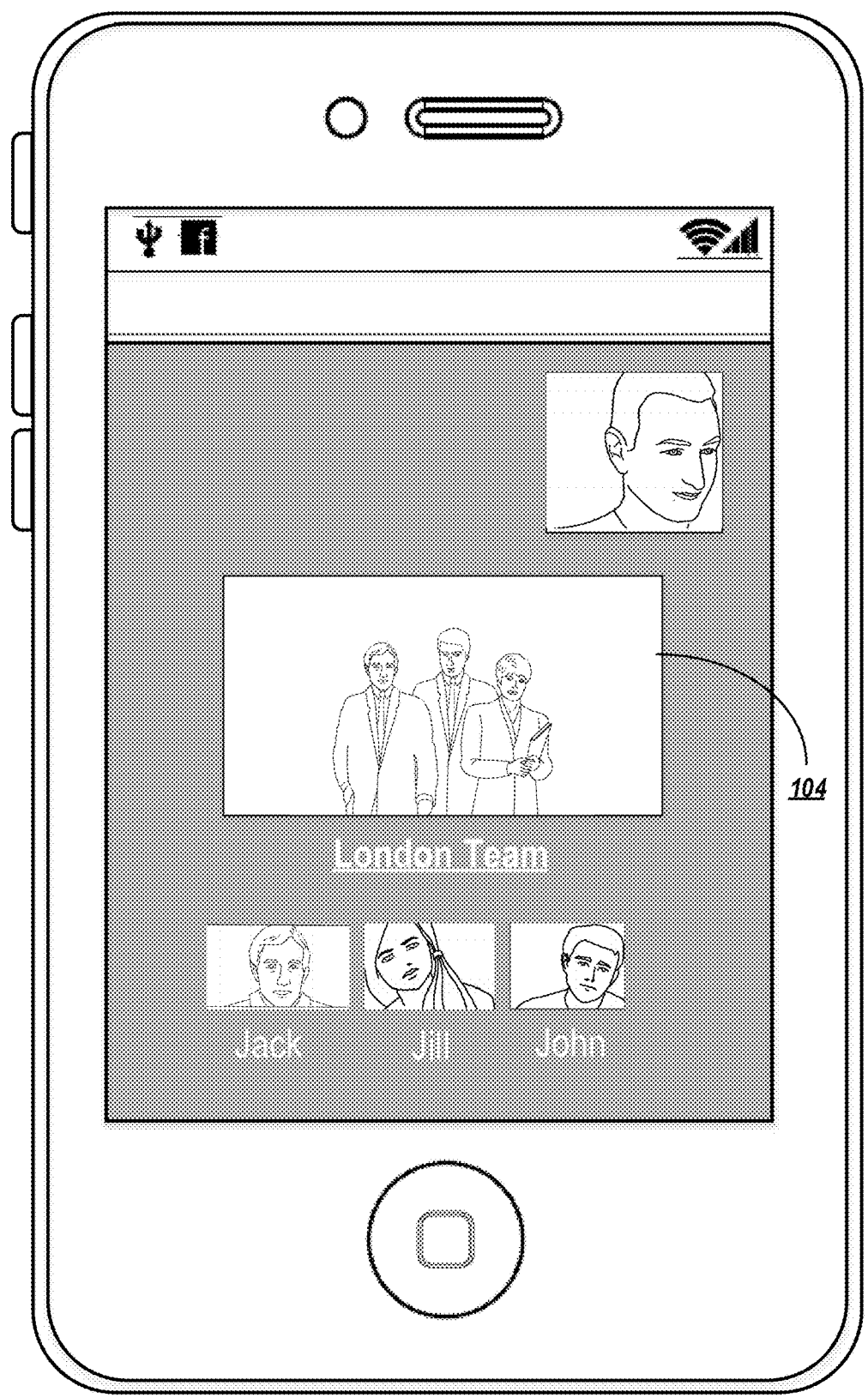
FIG. 2B depicts an exemplary call interface displaying the frame of FIG. 2A.

FIG. 2A depicts an exemplary frame 200 from a video call including three users. Problematically, when such a frame 200 is rendered on a relatively small display, such as the display of a mobile phone, the people may be rendered so small that relevant detail (e.g., facial expressions) is lost. For instance, FIG. 2B depicts an example of a call interface displaying the frame 200 in a main window 104 of the interface. As can be seen, the visual real estate available to render the frame 200 is too small of effectively show much detail.

Figure 2C:
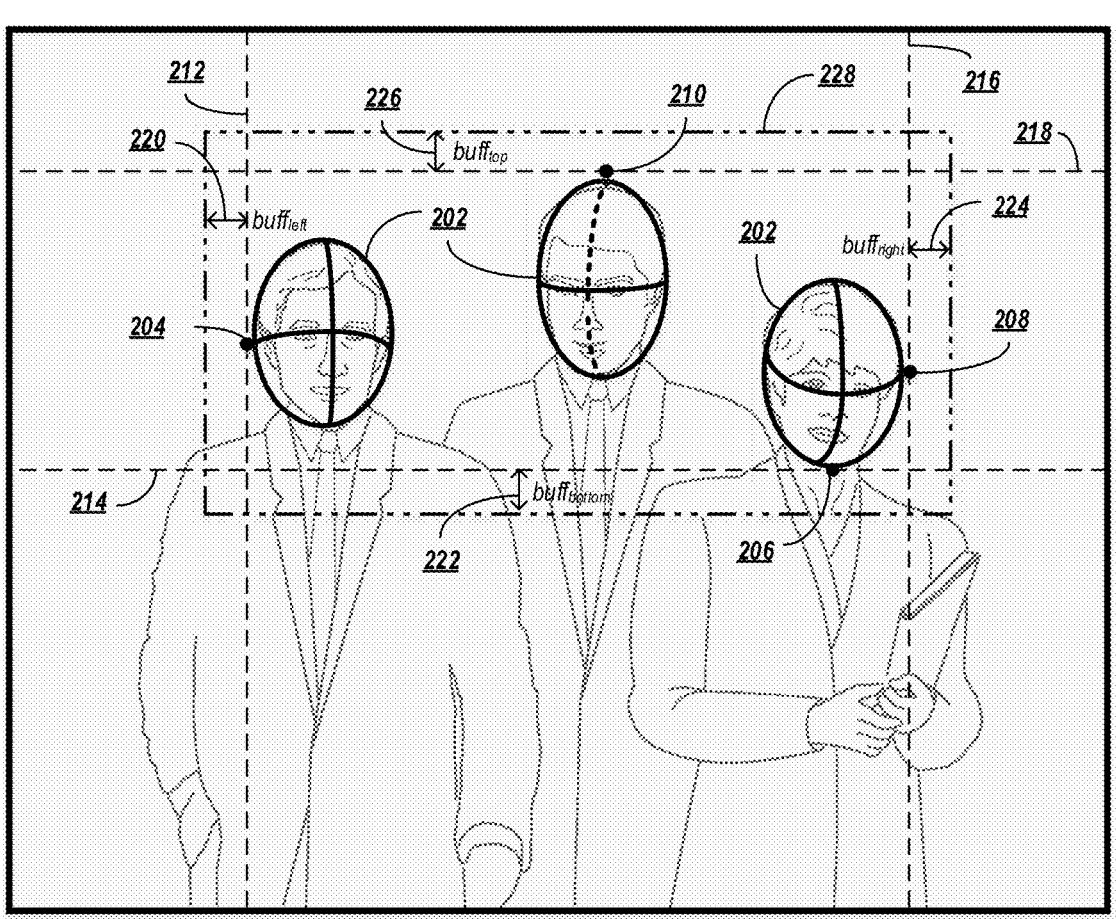
FIG. 2C depicts an exemplary technique for cropping the frame of FIG. 2A.

Therefore, the frame 200 may be cropped and centered to focus on the most important or relevant features of the users, which is typically the faces of the users. As shown in FIG. 2C, the faces of the users may be identified with facial detection technology, and a bounding shape 202 maybe drawn around the faces. In this example, three faces have been identified.

For each bounding shape 202, left, right, upper, and lower extremities of the bounding shape 202 may be identified. For example, the system may determine Cartesian (x,y) coordinates for the left-most, right-most, top-most, and bottom-most points on the respective bounding shapes. The system may then identify the absolute left-most point 204 of all the identified left-most points, the absolute bottom-most point 206 of all the identified bottom-most points, the absolute right-most point 208 of all the identified right-most points, and the absolute top-most point 210 of all the top-most points. These points represent the extreme bounds of the collective group of bounding shapes 202.

A vertical line may be drawn through the left-most point 204 and the right-most point 208. For example, a vertical line 212 is drawn through the left-most point 204, and a vertical line 216 is drawn through the right-most point 208. Similarly, a horizontal line 214 is drawn through the bottom-most point 206, and a horizontal line 218 is drawn through the top-most point 210. Collectively, these lines 212, 214, 216, 218 describe a minimal box that encompasses the faces.

In order to provide sufficient white-space around the faces, buffer regions may be defined extending from the lines 212, 214, 216, 218. For example, FIG. 2C includes a left buffer 220, a bottom buffer 222, a right buffer 224, and a top buffer 226. The buffer regions may be sized to provide a boundary around the faces while the users are engaged in the video call (rather than having the main window 104 extend directly to the edge of the user's faces, which may not be visually appealing), and to allow for some movement of the user's faces without the faces going off-screen. The size of the buffers 220, 222, 224, 226 may be predetermined. Each buffer 220, 222, 224, 226 may be of the same size, or the buffers may be of different sizes. In some embodiments, the left buffer 220 and the right buffer 224 may be of the same size as each other, and the top buffer 226 and the bottom buffer 222 may be of the same size as each other, but the top and bottom buffers may differ in size from the left and right buffers.

Figure 2D:
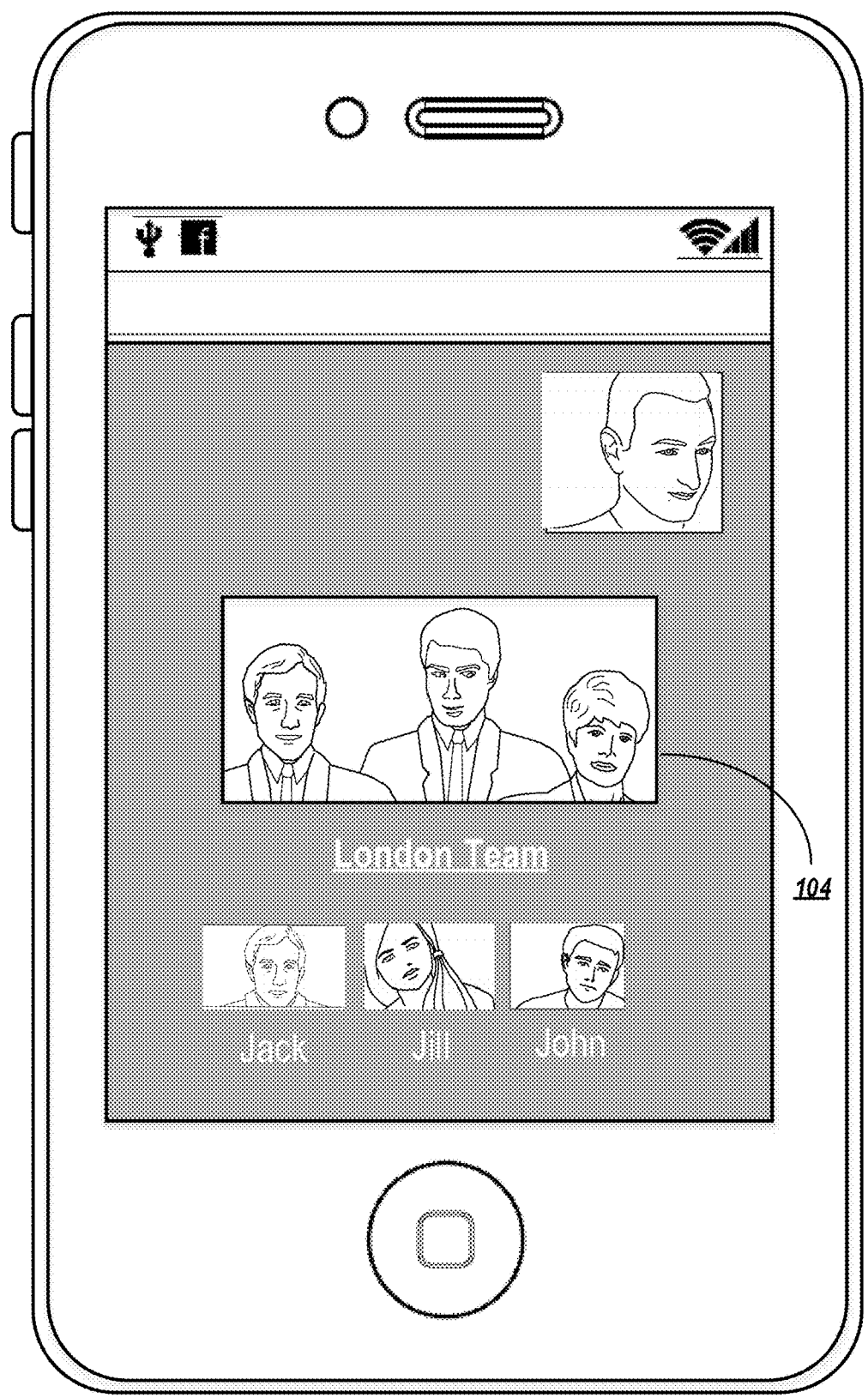
FIG. 2D depicts an exemplary call interface displaying the cropped frame of FIG. 2C.

The lines 212, 214, 216, 218 plus the buffers 220, 222, 224, 226 may collectively define a bounding box 228 around the faces. The area within the bounding box 228 may be displayed in the main window 104 of the interface, as shown in FIG. 2D. As can be seen in this example, more of the highly-relevant portion of the frame (i.e., the users' faces) is displayed in the main window when cropped based on facial detection as compared to when the entire frame is displayed (FIG. 2B).

In some embodiments, the size of the bounding box 228 may be constrained based on the size of the main window 104. For example, a relative length:height ratio of the bounding box 228 may be substantially the same as the length:height ratio of the main window 104.

In some embodiments, the sizes of the buffers 220, 222, 224, 226 may be variable, and may be associated with minimum and/or maximum values. The system may attempt to balance the relative sizes of the bottom buffer 222 compared to the top buffer 226, as well as the left buffer 220 as compared to the right buffer 224, while keeping each buffer between its associated minimum and maximum value and furthermore attempting to keep the length:height ratio of the bounding box 228 substantially the same as the length:height ratio of the main window 104. By working within these constraints, the bounding box 228 may be defined so as to encompass the user's faces, provide sufficient buffer areas, and still fit within the visual real estate available in the main window 104.

In some embodiments, facial detection technology may allow for the identification of features associated with the face, rather than simply the face as a whole. In particular, especially expressive features of the face, such as the eyes and mouth, may be identified. These may be distinguished from less-expressive features, such as the cheeks, ears, and nose, when processing the frame.

Figure 3A:
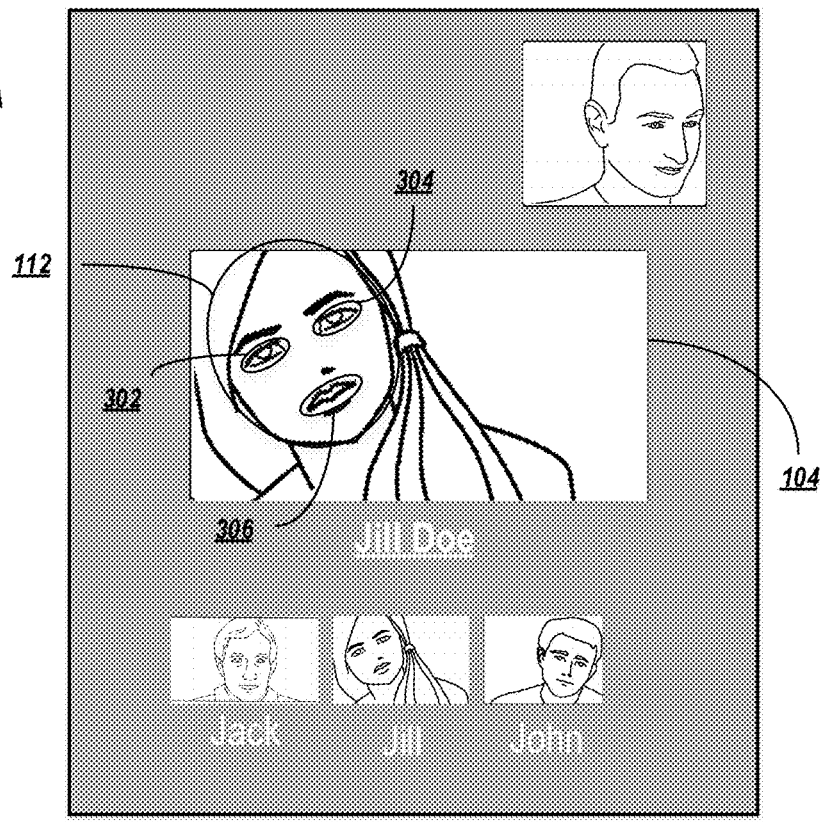
FIG. 3A depicts an exemplary call interface displaying a frame having a user's face with multiple facial features identified.

For example, FIG. 3A depicts an exemplary call interface displaying a frame having a user's face 112 with multiple facial features identified. In this example, the facial detection technology has identified a region of the frame corresponding to a first eye 302, a second eye 304, and a mouth 306.

Figure 3B:
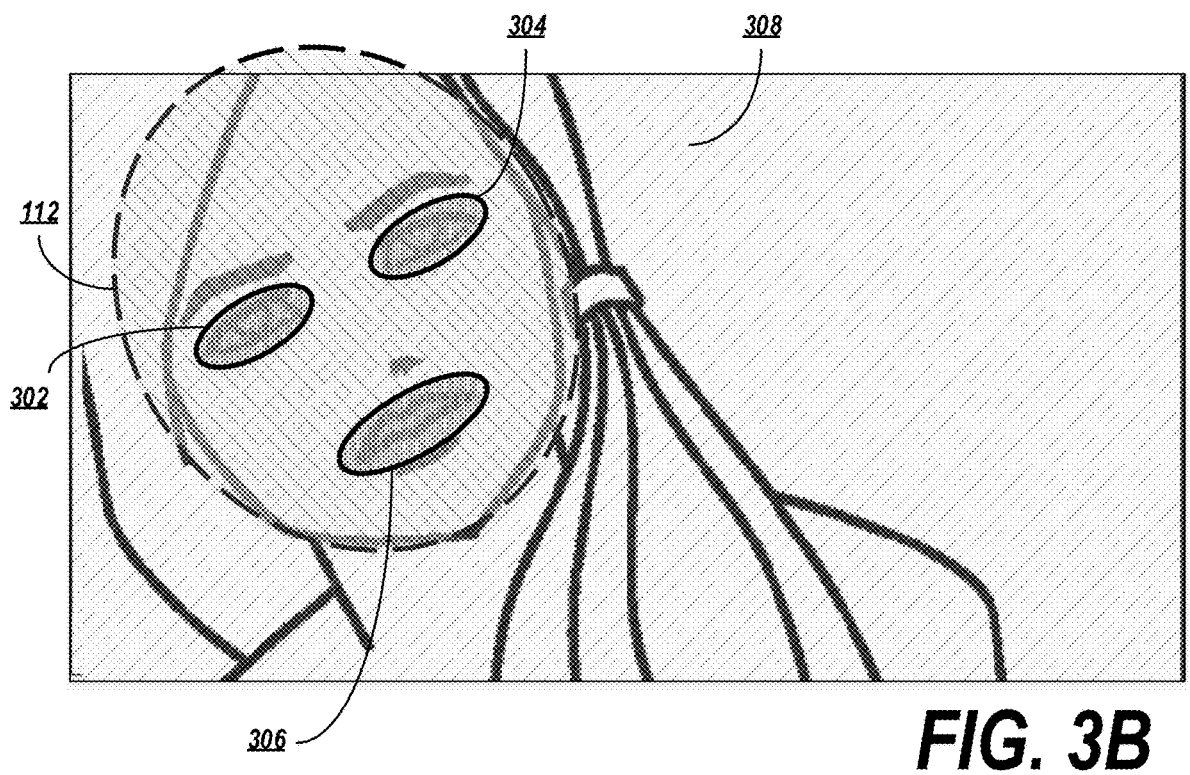
FIG. 3B depicts an exemplary technique for processing different areas of the frame in different manners.

FIG. 3B depicts a close-up of the frame from FIG. 3A. Anything falling outside the face 304 is considered to be background 308 (although some additional processing may be done to exclude other non-face parts of the user, such as the neck and torso, from the background 308). When processing the frame for a video call, the different portions of the frame may be processed in different ways. For example, the background 308 may be collected or stored at a lower resolution than the region belonging to the face 112, which may itself be collected or stored at a lower resolution than the region belonging to the expressive features 302, 304, 306. This technique may be particularly useful in the context of a video call in which limited resources are available (e.g. in a low-bandwidth environment), where more resources may be directed to particularly pertinent or relevant portions of the frame. This technique may also be useful to emphasize or de-emphasize certain portions of the frame (e.g., by maintaining the face 112 in focus while un-focusing the background 308, or vice versa).

Figure 4A:
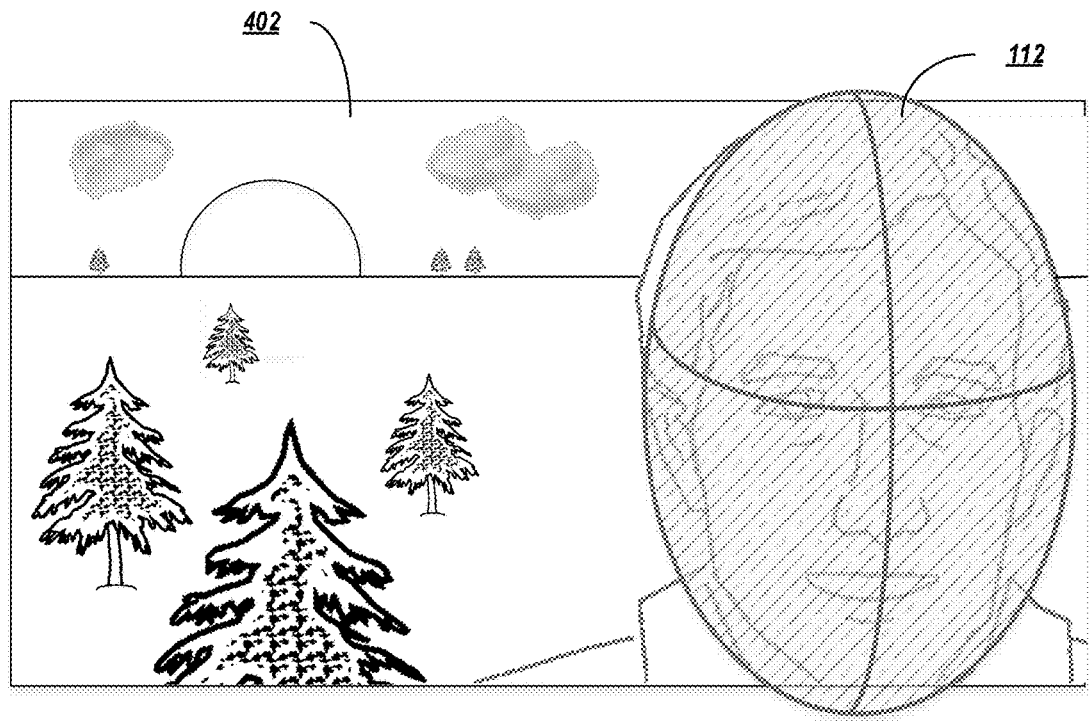
FIG. 4A depicts an exemplary video frame showing a user's face over an original background.
Figure 4B:
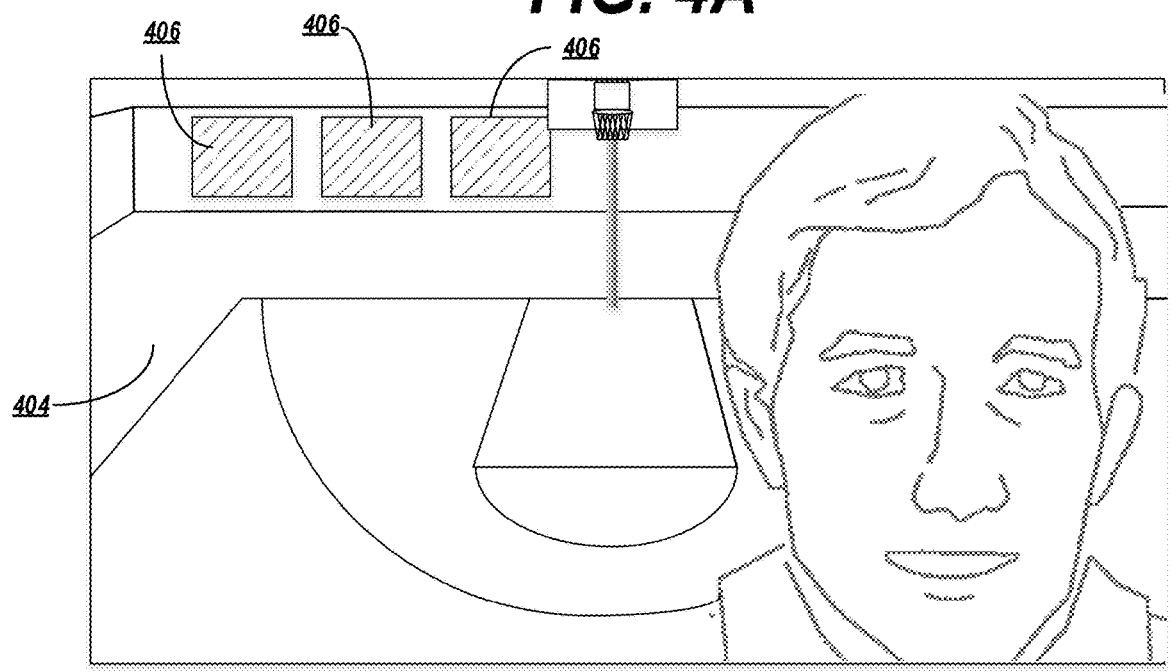
FIG. 4B depicts the video frame of FIG. 4A after the original background has been replaced with a new background.

Alternatively or in addition, the background 308 may be replaced with a new background. FIG. 4A depicts an exemplary video frame showing a user's face 112 over an original background 402. By detecting the area belonging to the face 112, the remaining area may be replaced with a new background 404, as shown in FIG. 4B. The new background 404 may be a static image or may be a dynamic video. The new background 404 may be a composite of multiple backgrounds—for example, a background video may show a basketball court, and a further distinct background element may be superimposed on the background video, such as a basketball player. The background element may be dynamic (e.g., a Team A fan may see Player A superimposes on the basketball court, while a Team B fan may see Player B superimposed on the basketball court).

The frame having the new background 404 may be transmitted to the other participants in the video call, or the original frame may be transmitted along with a background or an identifier for a background to be applied at a communications server or at a recipient mobile device.

The new background 404 may include one or more variable content areas 406. The variable content areas 406 may be integrated into the background (e.g., as signs, products being carried in the background, etc.). The variable content areas 406 may be replaced by content which may be selected based on user affinities or characteristics of a participant in the video call (e.g., informational content, targeted promotional material, etc.). In some embodiments, the affinity or characteristic of the user appearing superimposed on the background may determine the content of the variable content areas. In other embodiments, each recipient user may see the variable content areas replaced with content depending on their own characteristics or affinities.

Although the preceding examples use certain configurations and/or shapes for the video displays, it is understood that embodiments may use other configurations or shapes. For example, the video, preview, etc. may be displayed in a reduced-size format (e.g., in a corner of the display) and/or may have a round, rather than square, shape.

Next, embodiments in which facial detection is performed for cropping, centering, emphasis, and quality control in a video communication are described in more detail.

Facial Detection for Video Calls

FIG. 5 is a flowchart depicting exemplary logic 500 for performing facial detection and frame modification in a video call.

At block 502, a system (e.g., a client device or a communication server facilitating a video call) may receive one or more frames associated with a video call. For example, a video call application operating on a client mobile device may receive one or more video frames from a camera of the mobile device.

At block 504, the system may perform face detection on the frames. For example, the system may identify an area of the frames that are likely to (e.g., have a high confidence value) correspond to a face based on shape, color, features, etc. The system may process the frames in a manner similar to that described above in connection with FIG. 1D. Optionally, the system may identify one or more features of the face, such as eyes, mouth, ears, cheeks, nose, etc.

At block 506, the system may determine whether multiple faces have been detected. If multiple discrete areas of the frame(s) have a high confidence value as corresponding to a face, then the system may determine that multiple faces were detected.

If the determination at block 506 is "YES" (i.e., multiple faces were detected), processing may proceed to block 508 and the system may perform a multi-user crop and center procedure. For example, the system may crop the frame(s) as described above in connection with FIG. 2C. Processing may then proceed to block 510.

If the determination at block 506 is "NO" (i.e., multiple faces were not detected), then processing may proceed to block 512 and the system may determine whether the face is looking offscreen. For example, the system may evaluate the frame using techniques similar to those discussed above in connection with FIG. 1H.

If the determination at block 512 is "NO" (i.e., the user is not looking offscreen), then processing may proceed to block 514 and the system may perform a single-user crop- and center procedure. For example, the system may crop and center the frame as described above in connection with FIGS. 1D and 1F. Processing may then proceed to block 510.

If the determination at block 512 is "YES" (i.e., the user is looking offscreen), the system may refrain from performing the single-user crop and center procedure. Instead, processing may proceed directly to block 510.

At block 510, the system may determine whether one or more resources are below a first predefined or dynamic threshold. For example, the system may evaluate available processing power, memory resources, or network bandwidth to determine whether any or all of these features are in limited supply by comparing a value for any or all of these features with a predefined first threshold. The first threshold value may be associated with a state in which resources are limited but not critically so.

If the determination at block 510 is "NO" (i.e. the resources are not below the first threshold), then processing may proceed to block 520 and the cropped-and-centered image frames may be transmitted as normal.

If the determination at block 510 is "YES" (i.e., the resources are below the first threshold), then processing may proceed to block 516 and the system may determine whether the resources are below a second predefined or dynamic threshold. The second threshold value may be associated with a state in which resources are critically limited, or at least more constrained than the state associated with the first threshold value. Accordingly, the second threshold value may be less than (or may otherwise indicate more limited resources than) the first threshold value.

If the determination at block 516 is "NO" (i.e., the resources are between the first threshold value and the second threshold value), then processing may proceed to block 518. Because it was determined that resources are limited ("YES" at block 510) but not critically so ("NO" at block 516), some limited action may be taken to conserve resources. For example, in this case the system may use the information from block 504 to determine where the face is located in the frame, and may assign any region not belonging to the face to the background of the frame. The face may be captured and/or rendered at a relatively high resolution, while the background may be captured and/or rendered at a relatively low resolution. Alternatively or in addition, the background may be intentionally blurred, filtered, or otherwise manipulated to reduce the number of resources needed to store, transmit, and display the background. In some embodiments, the background may be removed entirely. Processing may then proceed to block 520 and the processed frame(s) may be transmitted to a communications server facilitating the video call and/or a recipient client device.

If the determination at block 516 is "YES" (i.e., the resources are below the second threshold value), then processing may proceed to block 522. Because it was determined that resources are critically limited ("YES" at block 516), more extensive action may be taken to conserve resources. For example, in this case the system may use the information from block 504 to determine where the face is located in the frame, and may assign any region not belonging to the face to the background of the frame. The system may further use the information from block 504 to determine where particularly expressive features (e.g., eyes, mouth) of the face are located in the frame. The areas corresponding to the expressive features may be captured and/or rendered at a relatively high resolution, while the background may be captured and/or rendered at a relatively low resolution. The remainder of the face not including the expressive features may either be rendered at the low resolution, or at an intermediate resolution between the high resolution and the low resolution. For example, depending on resource availability (e.g., whether the resource availability is closer to the first predetermined threshold or the second predetermined threshold), the remainder of the face may be displayed at the intermediate resolution or the low resolution, respectively.

Alternatively or in addition, the background and/or non-expressive facial features may be intentionally blurred, filtered, or otherwise manipulated to reduce the number of resources needed to store, transmit, and display the background and/or features. In some embodiments, the background may be removed entirely. Processing may then proceed to block 520 and the processed frame(s) may be transmitted to a communications server facilitating the video call and/or a recipient client device.

Figure 6A:
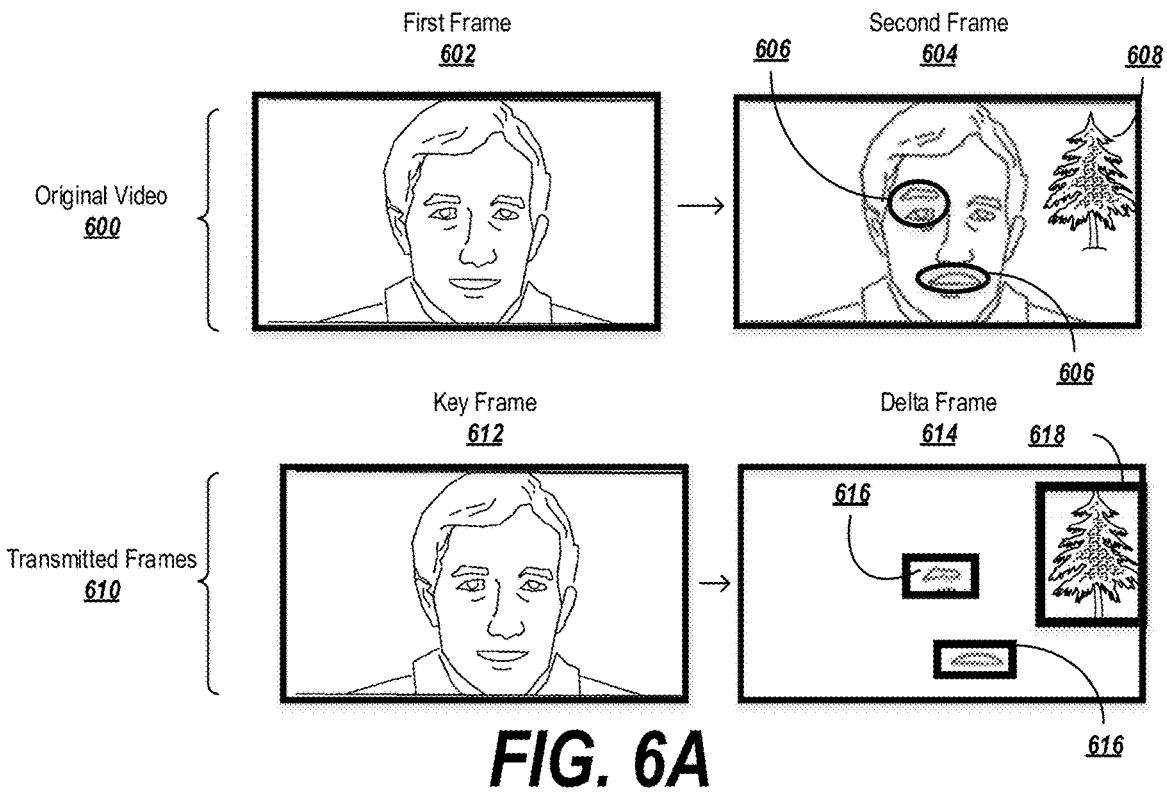
FIG. 6A depicts an exemplary technique for transmitting video frames.
Figure 6B:
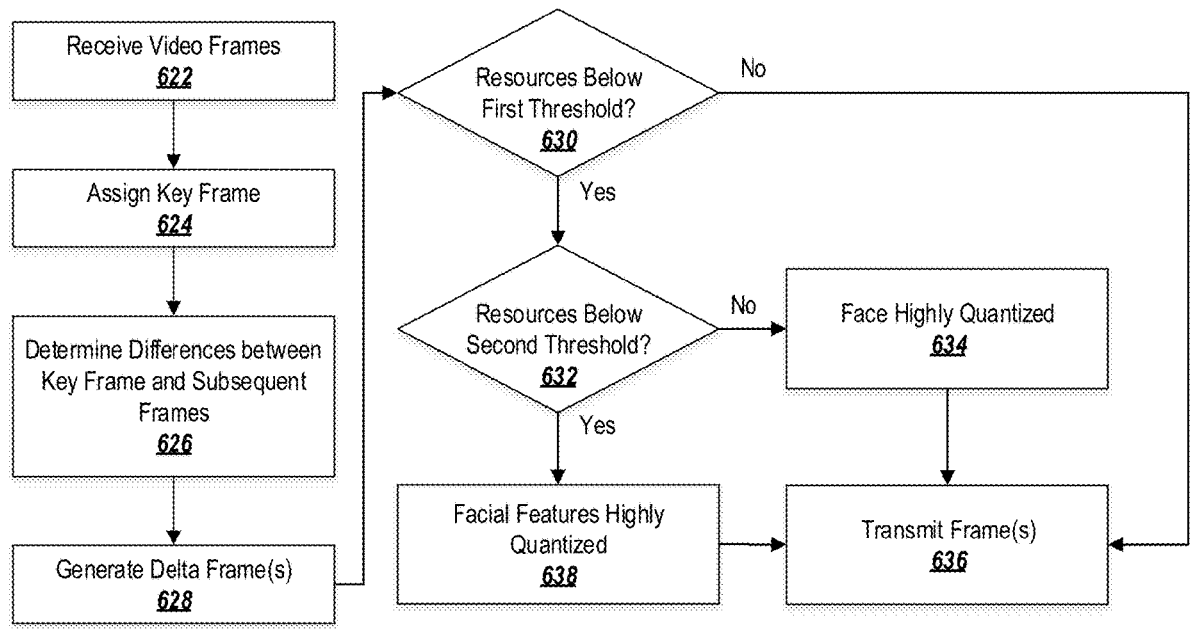
FIG. 6B is a flowchart depicting exemplary logic for quantizing various parts of a frame.

FIGS. 6A-6B describe a technique for performing the above-described resource evaluation in a system employing video compression technologies involving key frames.

FIG. 6A depicts an exemplary technique for transmitting video frames. An originally recorded video 600 may include a first frame 602 and a second frame 604. The second frame may be different from the first frame. For example, in the video 600 depicted in FIG. 6A, a first difference includes an area in which the depicted person has raised their eyebrow, a second difference in which the depicted person has begun to frown, and a third difference in which a tree has appeared in the background (the differences between likely adjacent video frames have been exaggerated for clarity of explanation). The first difference and the second difference represent facial differences 606 that occur in an area corresponding to the face, while the third difference is a background difference 608 that occurs in an area not corresponding to the face. In some embodiments, the differences may be further divided into expressive versus non-expressive regions of the face.

Certain compression techniques employ the idea of a "key frame" and a "delta frame" in order to reduce the size of the video when it is transmitted or stored. For example, in FIG. 6A the video is transmitted as a series of key frames 612 and delta frames 614. The key frames 612 represent index frames and include the full information contained in the originally captured frame. In this example, the key frame 612 includes the full content of the first frame 602 from the original video 600.

However, in a typical video (e.g., recording at 24 frames per second), some parts of the video are likely to remain constant from one frame to the next. In this example, the second frame 604 from the original video 600 includes only three differences. The delta frame 614 captures only these differences while ignoring or removing other portions of the second frame 604. Thus, the delta frame includes two facial features 616 and a background feature 618.

By removing unchanged content from the delta frame 614, the video can be transmitted or stored using fewer resources. When it comes time to transition from the first frame 602 to the second frame 604, the system retrieves the key frame 612 and applies the changes as defined in the delta frame 614. The resultant frame becomes the new base, and the next delta frame define changes to be made to this new base frame. Depending on the particular algorithm employed, a new key frame including all the information of the original video frame may be transmitted at predetermined intervals (e.g., every five seconds).

Information about whether the differences captured in the delta frame 614 are facial differences 616 or background differences 618 (and, further, whether the facial differences 616 relate to expressive or non-expressive features) may be used when storing or transmitting the delta frame. For example, facial differences 616 may be captured, stored, and transmitted at a higher resolution than background differences. Furthermore, in order to store or transmit the frame, it is often the case that the frame must be quantized (e.g., by mapping a relatively large number of continuous values to a relatively smaller discrete set of values, such as for color information, pixel values, etc.). Facial differences 616 may be more highly quantized (e.g. mapped to a larger set of values) than background differences 618.

For instance, FIG. 6B is a flowchart depicting exemplary logic 620 for quantizing various parts of a frame.

At block 622, a system (e.g., a client device or a communication server facilitating a video call) may receive one or more frames associated with a video call. For example, a video call application operating on a client mobile device may receive one or more video frames from a camera of the mobile device.

The system may perform face detection on the frames. For example, the system may identify an area of the frames that are likely to (e.g., have a high confidence value) correspond to a face based on shape, color, features, etc. The system may process the frames in a manner similar to that described above in connection with FIG. 1D. Optionally, the system may identify one or more features of the face, such as eyes, mouth, ears, cheeks, nose, etc.

At block 624, the system may assign or retrieve a key frame associated with the video frames. For example, if the system is configured to record a key frame every n number of seconds or frames, then the system may determine whether the current frame is the $n^{th}$ frame or the number of elapsed seconds since the last key frame was captured corresponds to n. If the currently-processed frame is determined to be a key frame, then the system may skip to block 636 and transmit the frame in its entirety. On the other hand, if the frame is not the key frame, then the system may retrieve the most recent key frame and/or delta frame transmitted.

At block 626, the system may determine any differences between the current frame and the key frame (also accommodating for differences already captured, or not yet captured, by delta frames between the key frame and the current frame). Areas of the currently processed frame that correspond to uncaptured differences may be collected together and used to generate a delta frame at block 628.

At block 630, the system may determine whether one or more resources are below a first predefined or dynamic threshold. For example, the system may evaluate available processing power, memory resources, or network bandwidth to determine whether any or all of these features are in limited supply by comparing a value for any or all of these features with a predefined first threshold. The first threshold value may be associated with a state in which resources are limited but not critically so.

If the determination at block 630 is "NO" (i.e. the resources are not below the first threshold), then processing may proceed to block 636 and the generated delta frame may be transmitted as normal.

If the determination at block 630 is "YES" (i.e., the resources are below the first threshold), then processing may proceed to block 632 and the system may determine whether the resources are below a second predefined or dynamic threshold. The second threshold value may be associated with a state in which resources are critically limited, or at least more constrained than the state associated with the first threshold value. Accordingly, the second threshold value may be less than (or may otherwise indicate more limited resources than) the first threshold value.

If the determination at block 632 is "NO" (i.e., the resources are between the first threshold value and the second threshold value), then processing may proceed to block 634. Because it was determined that resources are limited ("YES" at block 630) but not critically so ("NO" at block 632), some limited action may be taken to conserve resources. For example, in this case the system may use the information from block 622 and block 626 to determine whether the identified differences belong to a face region of the frame or a background region of the frame. Differences in the face region may be compressed to a relatively low level or quantized at a relatively high level, while differences in the background region may be compressed at a relatively high level or quantized at a relatively low level. Alternatively or in addition, the background may be intentionally blurred, filtered, or otherwise manipulated to reduce the number of resources needed to store, transmit, and display the background. In some embodiments, the background may be removed entirely. Processing may then proceed to block 636 and the processed delta frame(s) may be transmitted to a communications server facilitating the video call and/or a recipient client device.

If the determination at block 632 is "YES" (i.e., the resources are below the second threshold value), then processing may proceed to block 638. Because it was determined that resources are critically limited ("YES" at block 632), more extensive action may be taken to conserve resources. For example, in this case the system may use the information from block 622 and block 626 to whether the identified differences belong to a face region of the frame or a background region of the frame, and, for the features belonging to a face region, whether the features belong to an expressive region or a non-expressive region. Differences in the expressive regions may be compressed to a relatively low level or quantized at a relatively high level, while differences in the background region may be compressed at a relatively high level or quantized at a relatively low level. The remainder of the face not including the expressive features may either be quantized at a low level (or compressed at a high level), or may be compressed or quantized at an intermediate level between the high level and the low level. For example, depending on resource availability (e.g., whether the resource availability is closer to the first predetermined threshold or the second predetermined threshold), the remainder of the face may be quantized at the intermediate level or the low level, respectively.

Alternatively or in addition, the background and/or non-expressive facial features may be intentionally blurred, filtered, or otherwise manipulated to reduce the number of resources needed to store, transmit, and display the background and/or features. In some embodiments, the background may be removed entirely. Processing may then proceed to block 636 and the processed frame(s) may be transmitted to a communications server facilitating the video call and/or a recipient client device.

Facial Detection for Background Management

Further embodiments utilize facial detection for background management (e.g., to replace one background with another, as described above). FIG. 7 is a flowchart depicting exemplary logic 700 for identifying and replacing a background in a video frame.

At block 702, a system (e.g., a client device or a communication server facilitating a video call) may receive one or more frames associated with a video communication. For example, a video communication application operating on a client mobile device may receive one or more video frames from a camera of the mobile device.

At block 704, the system may perform face detection on the frames. For example, the system may identify an area of the frames that are likely to (e.g., have a high confidence value) correspond to a face based on shape, color, features, etc. The system may process the frames in a manner similar to that described above in connection with FIG. 1D.

At block 706, the system may use the information determined at block 704 to assign portions of the frames to the background of the frames. For example, any portion of the frame not encompassed by the detected face(s) may be assigned to the background.

At block 708, the system may receive a background modification instruction. The background modification instruction may be an explicit instruction to modify the background received from a user (e.g., through an interaction with a touch-screen display, a voice command, a gesture made in a video, etc.). The background modification instruction may also be an implicit instruction. For example, the system may be configured to apply a new background in certain contexts, such as when a detected emotional characteristic in the video frames is identified (e.g., an excited characteristic may cause an action sequence to play in the background) or when certain topics are discussed in the video conversation (e.g., discussing a recent sporting event may cause the sporting event to be displayed in the background, discussing a movie may cause a scene from the movie to play in the background, etc.).

At block 710, the system may optionally retrieve one or more user characteristics, such as by accessing a user's social graph (described below in connection with FIG. 8C).

At block 712, the system may select (or may receive a selection of) a background for application to the frames. The selected background may replace the old background in the users video feed that is then transmitted to recipient users. The background to be applied may be selected on the basis of the characteristics retrieved at block 710 (e.g., if the user has an affinity for baseball, the system may select a background of a baseball game).

In some embodiments, the user to which the background is to be applied may be presented with an interface allowing the user to select a particular background for application. In other embodiments, the background may be selected contextually, or contextual options may be presented to users for selection. For example, if the participants in the video call are currently talking about a basketball game, the background may be replaced with a basketball court. If the users are discussing a movie, the users may be placed inside a scene from the movie (or from the same genre of movies). If the users are discussing a band, the users may be placed in front of a background including footage of the band's concert. Other possibilities may also be employed.

At block 714, the system may determine whether variable content is associated with the selected background. For example, backgrounds may include metadata flags that identify if and where variable content is located. In other embodiments, the background may include areas having a characteristic associated with variable content, such as a particular color applied over a certain area.

If the determination at block 714 is "NO" (i.e., the background does not include variable content, then processing may proceed to block 716. If the determination at block 714 is "YES" (i.e., the background does include variable content), then processing may proceed to block 718. At block 718, the system may select content to be applied in the locations occupied by the variable content. For example, a library of variable content may be accessible to the client device (e.g., locally, or on a server facilitating the video call). The variable content may include promotional content associated with an advertiser. The system may access user preferences or characteristics (e.g., user information associated with a social networking graph), and may select content based on the user's preferences or characteristics. Different users may see different variable content in the rendered background. For example, the system may target promotional material associated with The variable content may be associated with default content that may be applied if no content is otherwise available for the user.

Processing may then proceed to block 716. At block 716, the system may transmit the video frames accessed at block 702. In some embodiments, background replacement may be performed locally, in which case the video transmitted at block 716 may include modified frames that have the replaced background. In other embodiments, background replacement may be performed remotely, at a server facilitating the video call or at the recipient client devices. In this case, processing may proceed to block 720 and the system may transmit a control signal (flagging that video frames associated with the control signal are subject to background modification) and information pertaining to the background. The information may include a copy of the background for application to the associated frames, or an ID of a background to be retrieved from a library (e.g., at the server or remote client device) and then applied to the associated frames. The control signal and background information may be transmitted on a control channel that is distinct from channels for carrying audio and/or video information.

Messaging System Overview

These examples may be implemented by a video communications system that is provided locally, at a client device, or remotely (e.g., at a remote server), or some combination thereof. FIGS. 8A-8C depict various examples of communications systems, and are discussed in more detail below.

FIG. 8A depicts an exemplary centralized communications system 800, which facilitates video communications between two or more users. The centralized system 800 may implement some or all of the structure and/or operations of a messaging service in a single computing entity, such as entirely within a single centralized server device 826.

The communications system 800 may include a computer-implemented system having software applications that include one or more components. Although the messaging system 800 shown in FIG. 8A has a limited number of elements in a certain topology, the messaging system 800 may include more or fewer elements in alternate topologies.

A communications service 800 may be generally arranged to receive, store, and deliver video communications.

A client device 810 may transmit video communications addressed to one or more recipient users, user accounts, or other identifiers resolving to receiving client devices 810. In exemplary embodiments, each of the client devices 810 and their respective clients 820 are associated with a particular user or users of the communications service 800. In some embodiments, the client devices 810 may be cellular devices such as smartphones and may be identified to the communications service 800 based on a phone number associated with each of the client devices 810. In some embodiments, each client may be associated with a user account registered with the communications service 800. In general, each client may be addressed through various techniques for the reception of video communications. While in some embodiments the client devices 810 may be cellular devices, in other embodiments one or more of the client devices 810 may be personal computers, tablet devices, any other form of computing device.

The client 810 may include one or more input devices 812 and one or more output devices 818. The input devices 812 may include, for example, microphones, keyboards, cameras, electronic pens, touch screens, and other devices for receiving inputs including message data, requests, commands, user interface interactions, selections, and other types of input. The output devices 818 may include a speaker, a display device such as a monitor or touch screen, and other devices for presenting an interface to the communications system 800.

The client 810 may include a memory, which may be a non-transitory computer readable storage medium, such as one or a combination of a hard drive, solid state drive, flash storage, read only memory, or random access memory. The memory may a representation of an input 814 and/or a representation of an output 816, as well as one or more applications. For example, the memory may store a messaging client 820 and/or a social networking client that allows a user to interact with a social networking service.

The input 814 may be textual, such as in the case where the input device 812 is a keyboard. Alternatively, the input 814 may be an audio or video recording, such as in the case where the input device 812 is a microphone or camera.

The input 814 may be subjected to automatic speech recognition (ASR) logic in order to transform the audio recording to text that is processable by the messaging system 800. The ASR logic may be located at the client device 810 (so that the audio recording is processed locally by the client 810 and corresponding text is transmitted to the communications server 826), or may be located remotely at the communications server 826 (in which case, the audio recording may be transmitted to the communications server 826 and the communications server 826 may process the audio into text). Other combinations are also possible—for example, if the input device 812 is a touch pad or electronic pen, the input 814 may be in the form of handwriting, which may be subjected to handwriting or optical character recognition analysis logic in order to transform the input 812 into processable text.

The client 810 may be provided with a network interface 822 for communicating with a network 824, such as the Internet. The network interface 822 may transmit the input 812 in a format and/or using a protocol compatible with the network 824 and may receive a corresponding output 816 from the network 824.

The network interface 822 may communicate through the network 824 to a messaging server 826. The messaging server 826 may be operative to receive, store, and forward messages between messaging clients.

The communications server 826 may include a network interface 822, communications preferences 828, and communications logic 830. The communications preferences 828 may include one or more privacy settings for one or more users and/or video communications. For example, the communications preferences 828 may include one or more settings, including default settings, for the logic described herein.

The communications logic 830 may include video call logic 832 for centering, cropping, and otherwise manipulating frames in a video communication, as described above. The communications logic 830 may further include background replacement logic 834 for identifying and replacing a background section of the frames, as further described above (the interface logic 834 may also or alternatively be provided on the clients 810).

The network interface 822 of the client 810 and/or the communications server 826 may also be used to communicate through the network 824 with a social networking server 836. The social networking server 836 may include or may interact with a social networking graph 838 that defines connections in a social network. Furthermore, the communications server 826 may connect to the social networking server 836 for various purposes, such as retrieving connection information, messaging history, event details, etc. from the social network.

A user of the client 810 may be an individual (human user), an entity (e.g., an enterprise, business, or third-party application), or a group (e.g., of individuals or entities) that interacts or communicates with or over the social networking server 836. The social-networking server 836 may be a network-addressable computing system hosting an online social network. The social networking server 836 may generate, store, receive, and send social-networking data, such as, for example, user-profile data, concept-profile data, social-graph information, or other suitable data related to the online social network. The social networking server 836 may be accessed by the other components of the network environment either directly or via the network 824.

The social networking server 836 may include an authorization server (or other suitable component(s)) that allows users to opt in to or opt out of having their actions logged by social-networking server 836 or shared with other systems (e.g., third-party systems, such as the messaging server 826), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 836 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 838. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 836 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 836 may send a request to the data store for the object. The request may identify the user associated with the request. The requested data object may only be sent to the user (or a client system 810 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 836 or explicit connections of a user to a node, object, entity, brand, or page on social networking server 836. In addition, or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for Soda Company?"); lightweight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 8A may be well-suited to deployment as a new system or as an upgrade to an existing system, because the logic is incorporated into the messaging server 826. In contrast, FIG. 8B depicts an exemplary distributed messaging system 850, in which functionality for selecting dominant/relevant participants and displaying a reduced-size interface is distributed and remotely accessible from the messaging server. Examples of a distributed system 850 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 8B are identical to those in FIG. 8A, and a description of these elements is not repeated here for the sake of brevity. The primary difference between the centralized embodiment and the distributed embodiment is the addition of a separate communication server 852, which hosts the relevant participant logic 832 and the interface logic 834. The communication server 852 may be distinct from the communications server 826 but may communicate with the communications server 826, either directly or through the network 824, to provide the functionality of the background replacement logic 834 and the video call logic 832 to the messaging server 826.

The embodiment depicted in FIG. 8B may be particularly well suited to allow exemplary embodiments to be deployed alongside existing messaging systems, for example when it is difficult or undesirable to replace an existing messaging server. Additionally, in some cases the communications server 826 may have limited resources (e.g. processing or memory resources) that limit or preclude the addition of the additional pivot functionality. In such situations, the capabilities described herein may still be provided through the separate communications server 852.

Figure 8C:
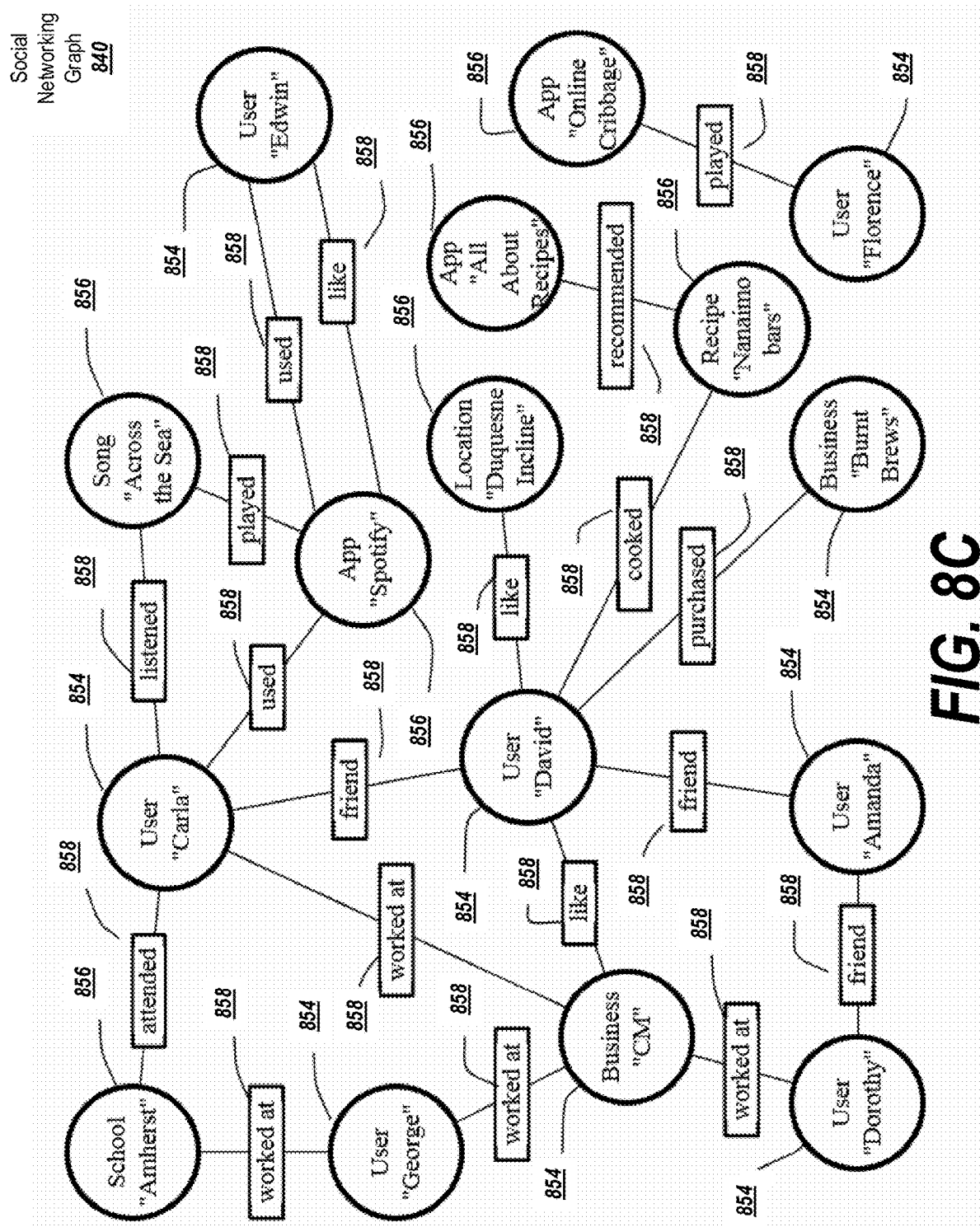
FIG. 8C depicts the social networking graph of FIGS. 8A-8B in more detail.

FIG. 8C illustrates an example of a social networking graph 838. In exemplary embodiments, a social networking service may store one or more social graphs 838 in one or more data stores as a social graph data structure via the social networking service.

The social graph 838 may include multiple nodes, such as user nodes 854 and concept nodes 856. The social graph 838 may furthermore include edges 858 connecting the nodes.

The nodes and edges of social graph 838 may be stored as data objects, for example, in a data store (such as a social-graph database). Such a data store may include one or more searchable or queryable indexes of nodes or edges of social graph 838.

The social graph 838 may be accessed by a social-networking server 826, client system 810, third-party system, or any other approved system or device for suitable applications.

A user node 854 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 854 corresponding to the user, and store the user node 854 in one or more data stores. Users and user nodes 854 described herein may, where appropriate, refer to registered users and user nodes 854 associated with registered users. In addition or as an alternative, users and user nodes 854 described herein may, where appropriate, refer to users that have not registered with the social-networking system. In particular embodiments, a user node 854 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 854 may be associated with one or more data objects corresponding to information associated with a user. In particular embodiments, a user node 854 may correspond to one or more webpages. A user node 854 may be associated with a unique user identifier for the user in the social-networking system.

In particular embodiments, a concept node 856 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 856 may be associated with one or more data objects corresponding to information associated with concept node 856. In particular embodiments, a concept node 856 may correspond to one or more webpages.

In particular embodiments, a node in social graph 838 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 856. Profile pages may be viewable by all or a selected subset of other users. As an example and not by way of limitation, a user node 854 may have a corresponding user-profile page in which the corresponding user may add content, make declarations, or otherwise express himself or herself. A business page may comprise a user-profile page for a commerce entity. As another example and not by way of limitation, a concept node 856 may have a corresponding concept-profile page in which one or more users may add content, make declarations, or express themselves, particularly in relation to the concept corresponding to concept node 856.

In particular embodiments, a concept node 856 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 854 corresponding to the user and a concept node 856 corresponding to the third-party webpage or resource and store edge 858 in one or more data stores.

In particular embodiments, a pair of nodes in social graph 838 may be connected to each other by one or more edges 858. An edge 858 connecting a pair of nodes may represent a relationship between the pair of nodes. In particular embodiments, an edge 858 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 858 connecting the first user's user node 854 to the second user's user node 854 in social graph 838 and store edge 858 as social-graph information in one or more data stores. In the example of FIG. 8C, social graph 838 includes an edge 858 indicating a friend relation between user nodes 854 of user "Amanda" and user "Dorothy." Although this disclosure describes or illustrates particular edges 858 with particular attributes connecting particular user nodes 854, this disclosure contemplates any suitable edges 858 with any suitable attributes connecting user nodes 854. As an example and not by way of limitation, an edge 858 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 838 by one or more edges 858.

In particular embodiments, an edge 858 between a user node 854 and a concept node 856 may represent a particular action or activity performed by a user associated with user node 854 toward a concept associated with a concept node 856. As an example and not by way of limitation, as illustrated in FIG. 8C, a user may "like," "attended," "played," "listened," "cooked," "worked at," or "watched" a concept, each of which may correspond to an edge type or subtype. A concept-profile page corresponding to a concept node 856 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (Music Service, which is an online music application). In this case, the social-networking system may create a "listened" edge 858 and a "used" edge (as illustrated in FIG. 8C) between user nodes 854 corresponding to the user and concept nodes 856 corresponding to the song and application to indicate that the user listened to the song and used the application. Moreover, the social-networking system may create a "played" edge 858 (as illustrated in FIG. 8C) between concept nodes 856 corresponding to the song and the application to indicate that the particular song was played by the particular application. In this case, "played" edge 858 corresponds to an action performed by an external application (Music Service) on an external audio file (the song "Across the Sea"). Although this disclosure describes particular edges 858 with particular attributes connecting user nodes 854 and concept nodes 856, this disclosure contemplates any suitable edges 858 with any suitable attributes connecting user nodes 854 and concept nodes 856. Moreover, although this disclosure describes edges between a user node 854 and a concept node 856 representing a single relationship, this disclosure contemplates edges between a user node 854 and a concept node 856 representing one or more relationships. As an example and not by way of limitation, an edge 858 may represent both that a user likes and has used at a particular concept. Alternatively, another edge 858 may represent each type of relationship (or multiples of a single relationship) between a user node 854 and a concept node 856 (as illustrated in FIG. 8C between user node 854 for user "Edwin" and concept node 856 for "Music Service").

In particular embodiments, the social-networking system may create an edge 858 between a user node 854 and a concept node 856 in social graph 838. As an example and not by way of limitation, a user viewing a concept-profile page (such as, for example, by using a web browser or a special-purpose application hosted by the user's client system) may indicate that he or she likes the concept represented by the concept node 856 by clicking or selecting a "Like" icon, which may cause the user's client system to send to the social-networking system a message indicating the user's liking of the concept associated with the concept-profile page. In response to the message, the social-networking system may create an edge 858 between user node 854 associated with the user and concept node 856, as illustrated by "like" edge 858 between the user and concept node 856. In particular embodiments, the social-networking system may store an edge 858 in one or more data stores. In particular embodiments, an edge 858 may be automatically formed by the social-networking system in response to a particular user action. As an example and not by way of limitation, if a first user uploads a picture, watches a movie, or listens to a song, an edge 858 may be formed between user node 854 corresponding to the first user and concept nodes 856 corresponding to those concepts. Although this disclosure describes forming particular edges 858 in particular manners, this disclosure contemplates forming any suitable edges 858 in any suitable manner.

The social graph 838 may further comprise a plurality of product nodes. Product nodes may represent particular products that may be associated with a particular business. A business may provide a product catalog to a consumer-to-business service and the consumer-to-business service may therefore represent each of the products within the product in the social graph 838 with each product being in a distinct product node. A product node may comprise information relating to the product, such as pricing information, descriptive information, manufacturer information, availability information, and other relevant information. For example, each of the items on a menu for a restaurant may be represented within the social graph 838 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 838. The information for a product node may be manipulated by the social-networking system as a product object that encapsulates information regarding the referenced product.

As such, the social graph 838 may be used to infer shared interests, shared experiences, or other shared or common attributes of two or more users of a social-networking system. For instance, two or more users each having an edge to a common business, product, media item, institution, or other entity represented in the social graph 838 may indicate a shared relationship with that entity, which may be used to suggest customization of a use of a social-networking system, including a messaging system, for one or more users.

The embodiments described above may be performed by a messaging architecture, an example of which is next described with reference to FIG. 9.

Messaging Architecture

Figure 9:
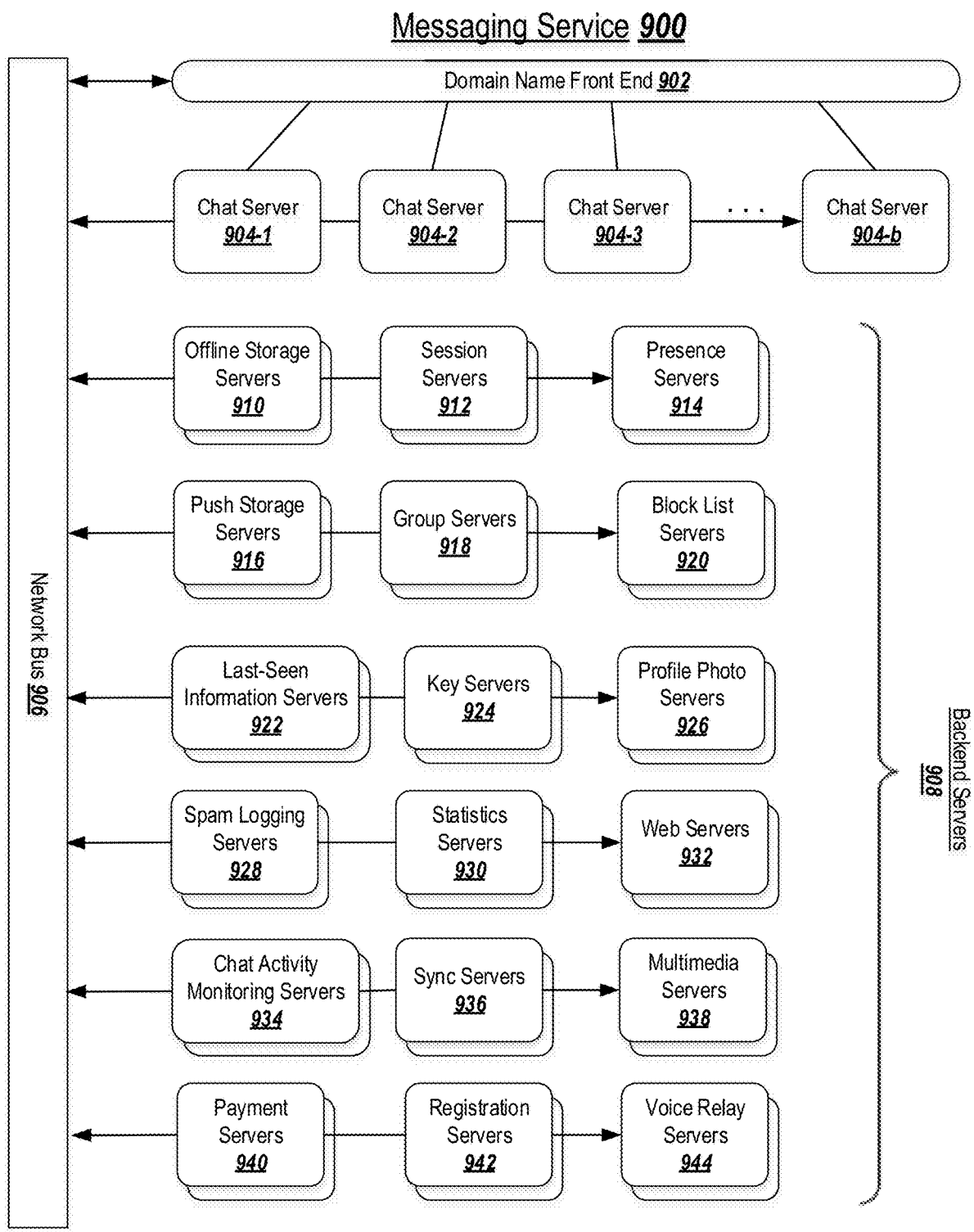
FIG. 9 is a block diagram depicting an example of a system for a messaging service.

FIG. 9 illustrates an embodiment of a plurality of servers implementing various functions of a messaging service 900 suitable for use with exemplary embodiments. It will be appreciated that different distributions of work and functions may be used in various embodiments of a messaging service 900.

The messaging service 900 may comprise a domain name front end 902. The domain name front end 902 may be assigned one or more domain names associated with the messaging service 900 in a domain name system (DNS). The domain name front end 902 may receive incoming connections and distribute the connections to servers providing various messaging services.

The messaging service 902 may comprise one or more chat servers 904. The chat servers 904 may comprise front-end servers for receiving and transmitting user-to-user messaging updates such as chat messages. Incoming connections may be assigned to the chat servers 904 by the domain name front end 902 based on workload balancing.

The messaging service 900 may comprise backend servers 908. The backend servers 908 may perform specialized tasks in the support of the chat operations of the front-end chat servers 904. A plurality of different types of backend servers 908 may be used. It will be appreciated that the assignment of types of tasks to different backend serves 908 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 900 may comprise one or more offline storage servers 910. The one or more offline storage servers 910 may store messaging content for currently-offline messaging clients in hold for when the messaging clients reconnect.

The messaging service 900 may comprise one or more sessions servers 912. The one or more session servers 912 may maintain session state of connected messaging clients.

The messaging service 900 may comprise one or more presence servers 914. The one or more presence servers 914 may maintain presence information for the messaging service 900. Presence information may correspond to user-specific information indicating whether or not a given user has an online messaging client and is available for chatting, has an online messaging client but is currently away from it, does not have an online messaging client, and any other presence state.

The messaging service 900 may comprise one or more push storage servers 916. The one or more push storage servers 916 may cache push requests and transmit the push requests to messaging clients. Push requests may be used to wake messaging clients, to notify messaging clients that a messaging update is available, and to otherwise perform server-side-driven interactions with messaging clients.

The messaging service 900 may comprise one or more group servers 918. The one or more group servers 918 may maintain lists of groups, add users to groups, remove users from groups, and perform the reception, caching, and forwarding of group chat messages.

The messaging service 900 may comprise one or more block list servers 920. The one or more block list servers 920 may maintain user-specific block lists, the user-specific incoming-block lists indicating for each user the one or more other users that are forbidden from transmitting messages to that user. Alternatively or additionally, the one or more block list servers 920 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 900 may comprise one or more last seen information servers 922. The one or more last seen information servers 922 may receive, store, and maintain information indicating the last seen location, status, messaging client, and other elements of a user's last seen connection to the messaging service 900.

The messaging service 900 may comprise one or more key servers 924. The one or more key servers may host public keys for public/private key encrypted communication.

The messaging service 900 may comprise one or more profile photo servers 926. The one or more profile photo servers 926 may store and make available for retrieval profile photos for the plurality of users of the messaging service 900.

The messaging service 900 may comprise one or more spam logging servers 928. The one or more spam logging servers 928 may log known and suspected spam (e.g., unwanted messages, particularly those of a promotional nature). The one or more spam logging servers 928 may be operative to analyze messages to determine whether they are spam and to perform punitive measures, in some embodiments, against suspected spammers (users that send spam messages).

The messaging service 900 may comprise one or more statistics servers 930. The one or more statistics servers may compile and store statistics information related to the operation of the messaging service 900 and the behavior of the users of the messaging service 900.

The messaging service 900 may comprise one or more web servers 932. The one or more web servers 932 may engage in hypertext transport protocol (HTTP) and hypertext transport protocol secure (HTTPS) connections with web browsers.

The messaging service 900 may comprise one or more chat activity monitoring servers 934. The one or more chat activity monitoring servers 934 may monitor the chats of users to determine unauthorized or discouraged behavior by the users of the messaging service 900. The one or more chat activity monitoring servers 934 may work in cooperation with the spam logging servers 928 and block list servers 920, with the one or more chat activity monitoring servers 934 identifying spam or other discouraged behavior and providing spam information to the spam logging servers 928 and blocking information, where appropriate to the block list servers 920.

The messaging service 900 may comprise one or more sync servers 936. The one or more sync servers 936 may sync the messaging system 500 with contact information from a messaging client, such as an address book on a mobile phone, to determine contacts for a user in the messaging service 900.

The messaging service 900 may comprise one or more multimedia servers 938. The one or more multimedia servers may store multimedia (e.g., images, video, audio) in transit between messaging clients, multimedia cached for offline endpoints, and may perform transcoding of multimedia.

The messaging service 900 may comprise one or more payment servers 940. The one or more payment servers 940 may process payments from users. The one or more payment servers 940 may connect to external third-party servers for the performance of payments.

The messaging service 900 may comprise one or more registration servers 942. The one or more registration servers 942 may register new users of the messaging service 900.

The messaging service 900 may comprise one or more voice relay servers 944. The one or more voice relay servers 944 may relay voice-over-internet-protocol (VoIP) voice communication between messaging clients for the performance of VoIP calls.

Figure 10:
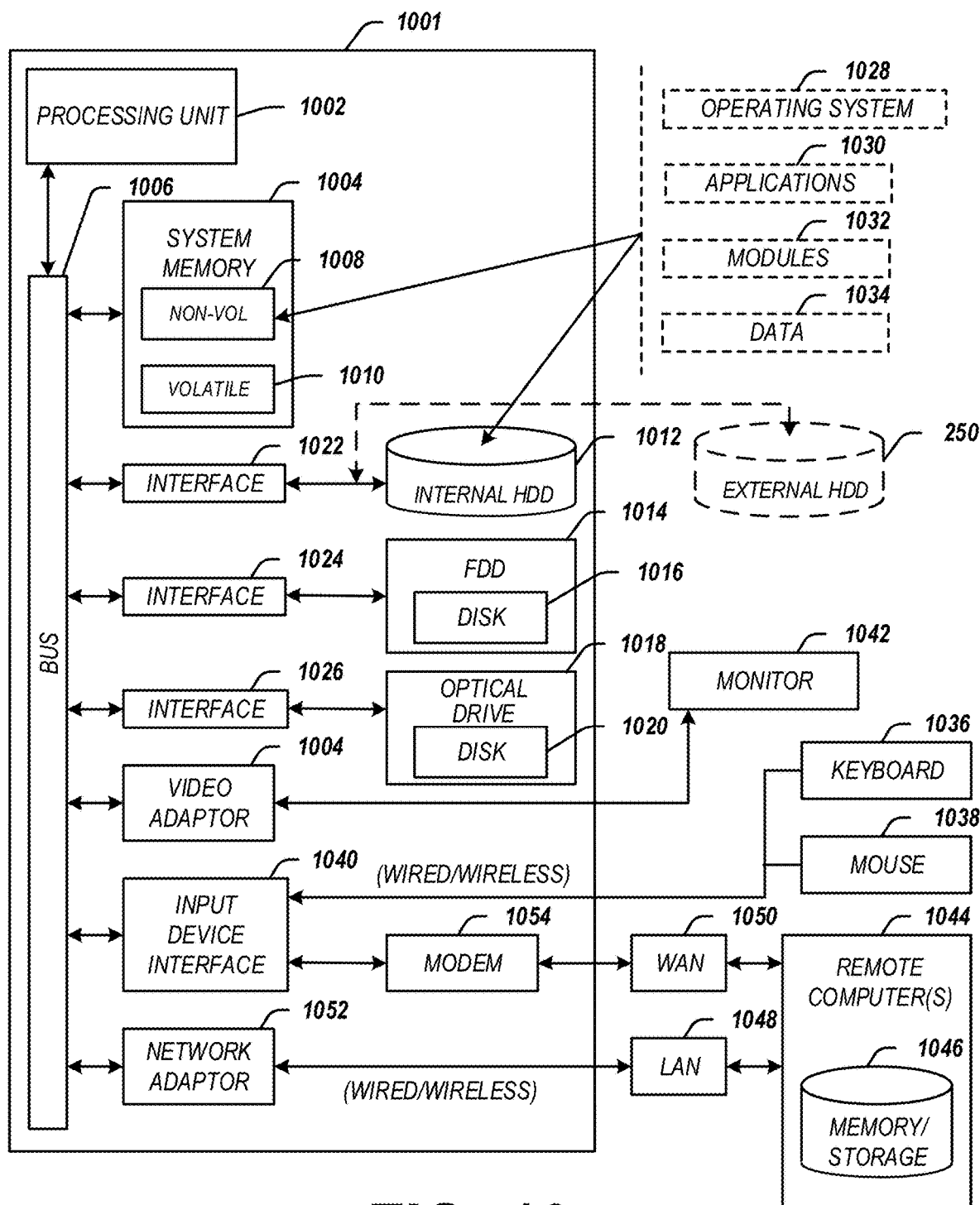
FIG. 10 is a block diagram illustrating an exemplary computing device suitable for use with exemplary embodiments.

The above-described methods may be embodied as instructions on a computer readable medium or as part of a computing architecture. FIG. 10 illustrates an embodiment of an exemplary computing architecture 1000 suitable for implementing various embodiments as previously described. In one embodiment, the computing architecture 1000 may comprise or be implemented as part of an electronic device, such as a computer 1001. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1002, a system memory 1004 and a system bus 1006. The processing unit 1002 can be any of various commercially available processors, including without limitation an Athlon®, Duron® and Opteron® processors; embedded and secure processors; DragonBall® and PowerPC® processors; Cell processors; Celeron®, Core (2) Duo®, Itanium®, Pentium®, Xeon®, and XScale® processors; and similar processors. Dual microprocessors, multi-core processors, and other multi-processor architectures may also be employed as the processing unit 1002.

The system bus 1006 provides an interface for system components including, but not limited to, the system memory 1004 to the processing unit 1002. The system bus 1006 can be any of several types of bus structure that may further interconnect to a memory bus (with or without a memory controller), a peripheral bus, and a local bus using any of a variety of commercially available bus architectures. Interface adapters may connect to the system bus 1006 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1004 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1004 can include non-volatile memory 1008 and/or volatile memory 1010. A basic input/output system (BIOS) can be stored in the non-volatile memory 1008.

The computing architecture 1000 may include various types of computer-readable storage media in the form of one or more lower speed memory units, including an internal (or external) hard disk drive (HDD) 1012, a magnetic floppy disk drive (FDD) 1014 to read from or write to a removable magnetic disk 1016, and an optical disk drive 1018 to read from or write to a removable optical disk 1020 (e.g., a CD-ROM or DVD). The HDD 1012, FDD 1014 and optical disk drive 1020 can be connected to the system bus 1006 by an HDD interface 1022, an FDD interface 1024 and an optical drive interface 1026, respectively. The HDD interface 1022 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 1008, 1012, including an operating system 1028, one or more application programs 1030, other program modules 1032, and program data 1034. In one embodiment, the one or more application programs 1030, other program modules 1032, and program data 1034 can include, for example, the various applications and/or components of the messaging system 500.

A user can enter commands and information into the computer 1001 through one or more wire/wireless input devices, for example, a keyboard 1036 and a pointing device, such as a mouse 1038. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1002 through an input device interface 1040 that is coupled to the system bus 1006, but can be connected by other interfaces such as a parallel port, IEEE 694 serial port, a game port, a USB port, an IR interface, and so forth.

A monitor 1042 or other type of display device is also connected to the system bus 1006 via an interface, such as a video adaptor 1044. The monitor 1042 may be internal or external to the computer 1001. In addition to the monitor 1042, a computer typically includes other peripheral output devices, such as speakers, printers, and so forth.

The computer 1001 may operate in a networked environment using logical connections via wire and/or wireless communications to one or more remote computers, such as a remote computer 1044. The remote computer 1044 can be a workstation, a server computer, a router, a personal computer, portable computer, microprocessor-based entertainment appliance, a peer device or other common network node, and typically includes many or all of the elements described relative to the computer 1001, although, for purposes of brevity, only a memory/storage device 1046 is illustrated. The logical connections depicted include wire/wireless connectivity to a local area network (LAN) 1048 and/or larger networks, for example, a wide area network (WAN) 1050. Such LAN and WAN networking environments are commonplace in offices and companies, and facilitate enterprise-wide computer networks, such as intranets, all of which may connect to a global communications network, for example, the Internet.

When used in a LAN networking environment, the computer 1001 is connected to the LAN 1048 through a wire and/or wireless communication network interface or adaptor 1052. The adaptor 1052 can facilitate wire and/or wireless communications to the LAN 1048, which may also include a wireless access point disposed thereon for communicating with the wireless functionality of the adaptor 1052.

When used in a WAN networking environment, the computer 1001 can include a modem 1054, or is connected to a communications server on the WAN 1050, or has other means for establishing communications over the WAN 1050, such as by way of the Internet. The modem 1054, which can be internal or external and a wire and/or wireless device, connects to the system bus 1006 via the input device interface 1040. In a networked environment, program modules depicted relative to the computer 1001, or portions thereof, can be stored in the remote memory/storage device 1046. It will be appreciated that the network connections shown are exemplary and other means of establishing a communications link between the computers can be used.

The computer 1001 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
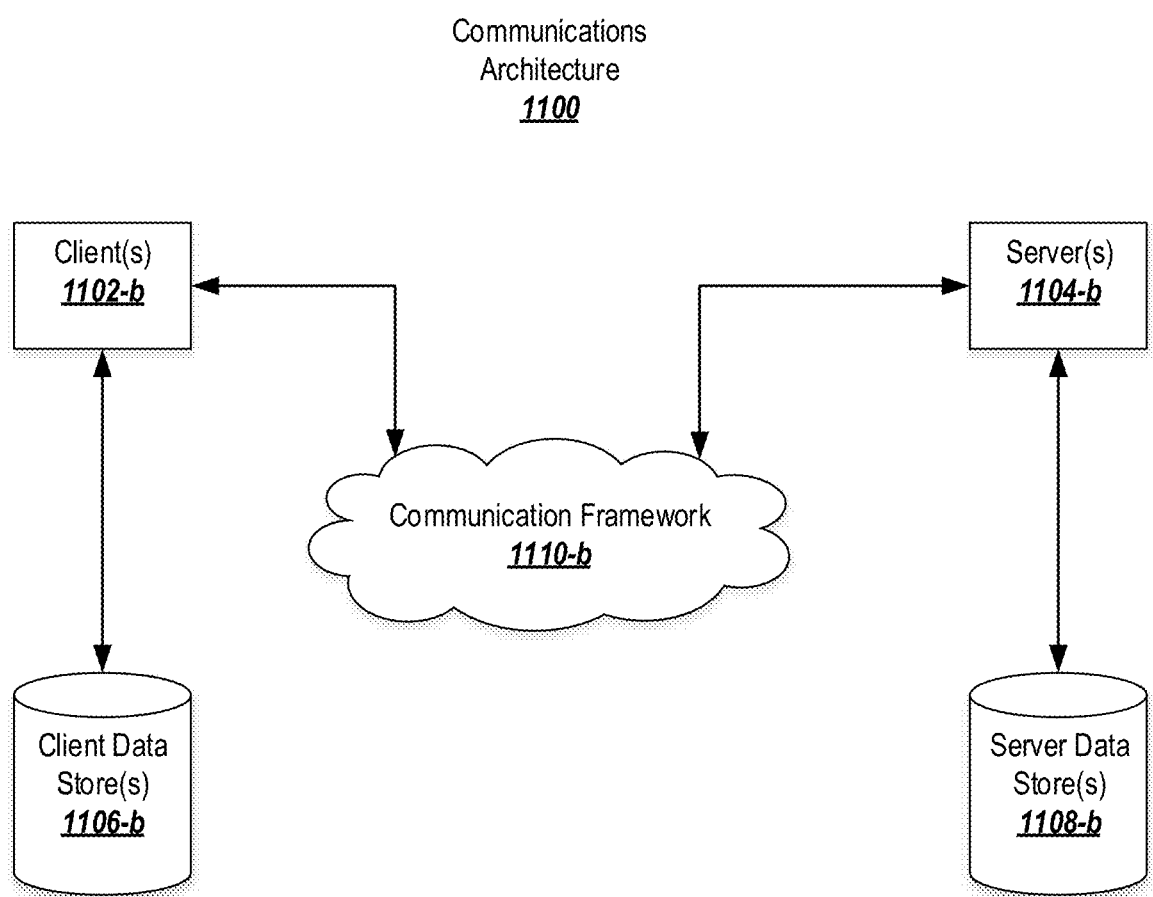
FIG. 11 depicts an exemplary communication architecture.

FIG. 11 is a block diagram depicting an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 includes one or more clients 1102 and servers 1104. The clients 1102 may implement the client device 510. The servers 1104 may implement the server device 526. The clients 1102 and the servers 1104 are operatively connected to one or more respective client data stores 1106 and server data stores 1108 that can be employed to store information local to the respective clients 1102 and servers 1104, such as cookies and/or associated contextual information.

The clients 1102 and the servers 1104 may communicate information between each other using a communication framework 1110. The communications framework 1110 may implement any well-known communications techniques and protocols. The communications framework 1110 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1110 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
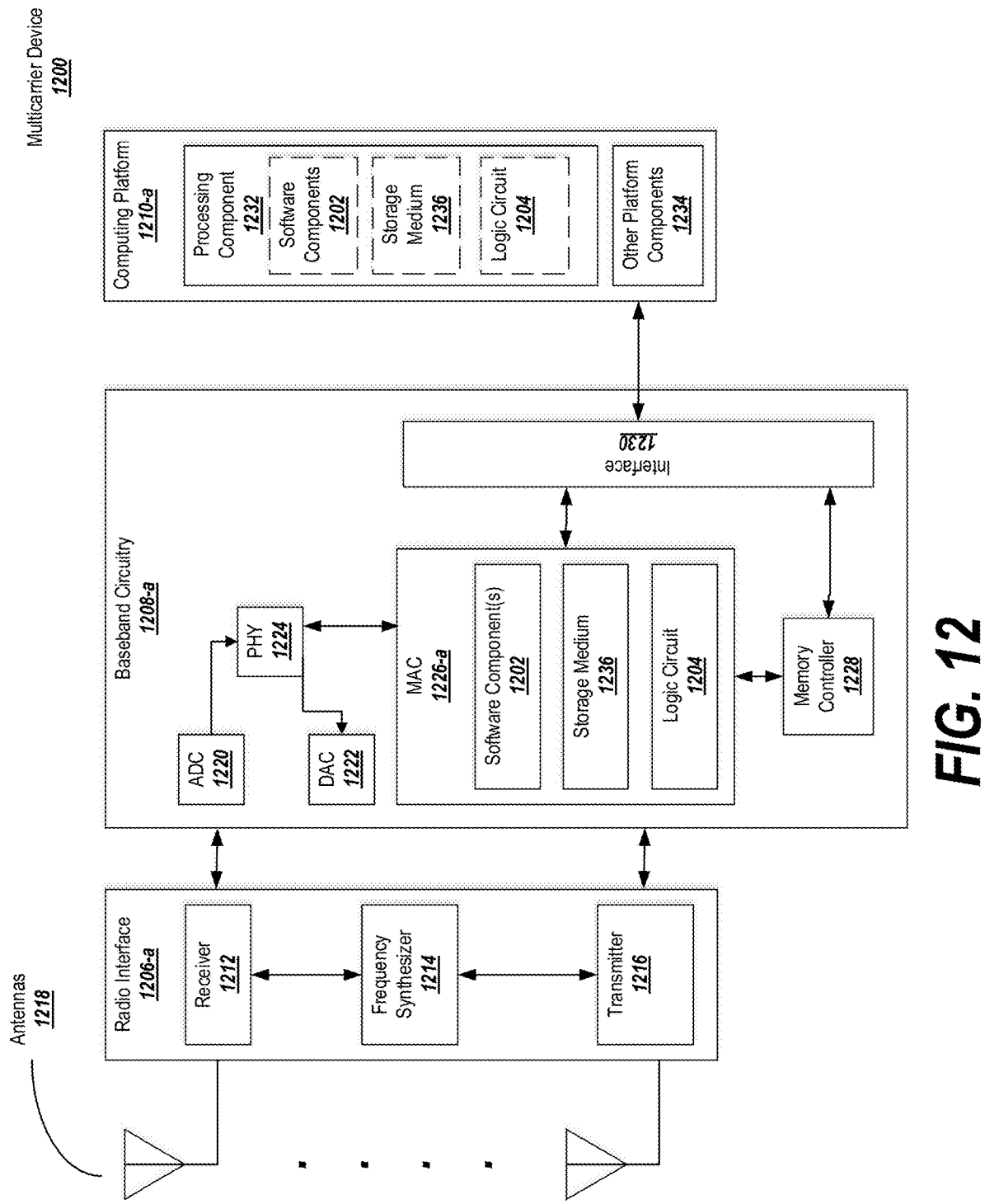
FIG. 12 is a block diagram depicting an exemplary multicarrier communications device.

FIG. 12 illustrates an embodiment of a device 1200 for use in a multicarrier OFDM system, such as the messaging system 500. The device 1200 may implement, for example, software components 1202 as described with reference to the messaging component logic 600, the intent determination logic 700, and the group selection logic 800. The device 1200 may also implement a logic circuit 1204. The logic circuit 1204 may include physical circuits to perform operations described for the messaging system 500. As shown in FIG. 12, device 1200 may include a radio interface 1206, baseband circuitry 1208, and a computing platform 1210, although embodiments are not limited to this configuration.

The device 1200 may implement some or all of the structure and/or operations for the messaging system 500 and/or logic circuit 1204 in a single computing entity, such as entirely within a single device. Alternatively, the device 1200 may distribute portions of the structure and/or operations for the messaging system 500 and/or logic circuit 1204 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 1206 may include a component or combination of components adapted for transmitting and/or receiving single carrier or multicarrier modulated signals (e.g., including complementary code keying (CCK) and/or orthogonal frequency division multiplexing (OFDM) symbols) although the embodiments are not limited to any specific over-the-air interface or modulation scheme. The radio interface 1206 may include, for example, a receiver 1212, a transmitter 1214 and/or a frequency synthesizer 1216. The radio interface 1206 may include bias controls, a crystal oscillator and/or one or more antennas 1218. In another embodiment, the radio interface 1206 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 1208 may communicate with the radio interface 1206 to process receive and/or transmit signals and may include, for example, an analog-to-digital converter 1220 for down converting received signals, and a digital-to-analog converter 1222 for up-converting signals for transmission. Further, the baseband circuitry 1208 may include a baseband or physical layer (PHY) processing circuit 1224 for PHY link layer processing of respective receive/transmit signals. The baseband circuitry 1208 may include, for example, a processing circuit 1226 for medium access control (MAC)/data link layer processing. The baseband circuitry 1208 may include a memory controller 1228 for communicating with the processing circuit 1226 and/or a computing platform 1210, for example, via one or more interfaces 1230.

In some embodiments, the PHY processing circuit 1224 may include a frame construction and/or detection module, in combination with additional circuitry such as a buffer memory, to construct and/or deconstruct communication frames, such as radio frames. Alternatively or in addition, the MAC processing circuit 1226 may share processing for certain of these functions or perform these processes independent of the PHY processing circuit 1224. In some embodiments, MAC and PHY processing may be integrated into a single circuit.

The computing platform 1210 may provide computing functionality for the device 1200. As shown, the computing platform 1210 may include a processing component 1232. In addition to, or alternatively of, the baseband circuitry 1208, the device 1200 may execute processing operations or logic for the messaging system 500 and logic circuit 1204 using the processing component 1232. The processing component 1232 (and/or the PHY 1224 and/or MAC 1226) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1210 may further include other platform components 1234. Other platform components 1234 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 1200 may be, for example, an ultra-mobile device, a mobile device, a fixed device, a machine-tomachine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 1200 described herein, may be included or omitted in various embodiments of the device 1200, as suitably desired. In some embodiments, the device 1200 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of the device 1200 may be implemented using any combination of discrete circuitry, application specific integrated circuits (ASICs), logic gates and/or single chip architectures. Further, the features of the device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 1236 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
  accessing one or more frames from a video call, the video call comprising image data and audio data, the one or more frames comprising a face;
  performing face detection to detect a portion of the one or more frames that substantially comprises the face;
  detecting expressive and non-expressive features in the detected face, the expressive features including one or more eyes and a mouth and the non-expressive features including all other areas of the face;
  based on the face detection, assigning an area of the one or more frames not belonging to the face as a background of the one or more frames;
  blurring, filtering or reducing in resolution the background and the non-expressive features of the face in the one or more frames to emphasize the expressive features of the face.

2. The method of claim 1 further comprising:
  transmitting the one or more frames to a receiving participant in the video call.

3. The method of claim 1 further comprising:
  rendering the expressive features of the face at a first resolution;
  rendering the non-expressive features of the face at a second resolution, the second resolution being lower than the first resolution; and
  rendering the background at third resolution, third resolution being lower than the second resolution.

4. The method of claim 2 further comprising removing the background in the one or more frames prior to transmitting the one or more frames to the receiving participant in lieu of blurring, filtering or reducing in resolution the background.

5. The method of claim 4 further comprising:
  transmitting, with the one or more frames, a control signal comprising an identifier of a background to be applied by the receiving participant in the video call.

6. The method of claim 1 wherein the area identified as the background excludes any portion of a person appearing in the frame.

7. An apparatus comprising:
  a processor;
  memory containing instructions for execution by the processor, the instructions causing the processor to perform functions for facilitating a video call comprising:
    accessing one or more frames from a video call, the video call comprising image data and audio data, the one or more frames comprising a face;
    performing face detection to detect a portion of the one or more frames that substantially comprises the face;
    detecting expressive and non-expressive features in the detected face the expressive features including one or more eyes and a mouth and the non-expressive features including all other areas of the face;
    based on the face detection, assigning an area of the one or more frames not belonging to the face as a background of the one or more frames;
    blurring, filtering or reducing in resolution the background and the non-expressive features of the face in the one or more frames to emphasize the expressive features of the face.

8. The system of claim 7, comprising further instructions causing the processor to perform the function of:
  transmitting the one or more frames to a receiving participant in the video call.

9. The system of claim 7 comprising further instructions causing the processor to perform the functions of:
  rendering the expressive features of the face at a first resolution;
  rendering the non-expressive features of the face at a second resolution, the second resolution being lower than the first resolution; and
  rendering the background at third resolution, third resolution being lower than the second resolution.

10. The system of claim 8 further comprising removing the background in the one or more frames prior to transmitting the one or more frames to the receiving participant in lieu of blurring, filtering or reducing in resolution the background.

11. The system of claim 10 comprising further instructions causing the processor to perform the functions of:
  transmitting, with the one or more frames, a control signal comprising an identifier of a background to be applied by the receiving participant in the video call.

12. A non-transitory, computer-readable storage medium storing instructions configured to cause a processor to:
  access one or more frames from a video call, the video call comprising image data and audio data, the one or more frames comprising a face;
  perform face detection to detect a portion of the one or more frames that substantially comprises the face;
  detect expressive and non-expressive features in the detected face, the expressive features including one or more eyes and a mouth and the non-expressive features including all other areas of the face;
  based on the face detection, assign an area of the one or more frames not belonging to the face as a background of the one or more frames;
  blurring, filtering or reducing in resolution the background and the non-expressive areas of the face in the one or more frames to emphasize the expressive features of the face.

13. The medium of claim 12, storing further instructions to cause the processor to:
  transmit the one or more frames to a receiving participant in the video call.

14. The medium of claim 12, storing further instructions to cause the processor to:
  render the expressive features of the face at a first resolution;

render the non-expressive features of the face at a second resolution, the second resolution being lower than the first resolution; and render the background at third resolution, third resolution being lower than the second resolution.

15. The medium of claim 13, storing further instructions to cause the processor to:

remove the background in the one or more frames prior to transmitting the one or more frames to the receiving participant in lieu of blurring, filtering or reducing in resolution the background; and transmit, with the one or more frames, a control signal comprising an identifier of a background to be applied by the receiving participant in the video call.

* * * * *